US006740716B2

(12) United States Patent
Webb et al.

(10) Patent No.: US 6,740,716 B2
(45) Date of Patent: May 25, 2004

(54) ORGANOBORANE AMINE COMPLEX POLYMERIZATION INITIATORS AND POLYMERIZABLE COMPOSITIONS

(75) Inventors: Steven P. Webb, Midland, MI (US); Mark F. Sonnenschein, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 198 days.

(21) Appl. No.: 10/012,629

(22) Filed: Oct. 30, 2001

(65) Prior Publication Data

US 2003/0120005 A1 Jun. 26, 2003

(51) Int. Cl.$^7$ .................................................. C08F 4/52
(52) U.S. Cl. .................... 526/196; 526/197; 526/198; 526/208; 525/130; 525/131; 525/459; 428/515; 428/516; 428/500
(58) Field of Search ................ 428/421, 515, 428/516, 500; 526/196, 197, 198, 208; 525/130, 131, 134, 459

(56) References Cited

U.S. PATENT DOCUMENTS

| | | | |
|---|---|---|---|
| 3,275,611 A | 9/1966 | Mottus et al. | 260/80.5 |
| 3,527,737 A | 9/1970 | Masuhara et al. | 260/78.5 |
| 4,385,153 A | 5/1983 | Ritter | 524/522 |
| 4,515,724 A | 5/1985 | Ritter | 260/410 |
| 4,638,092 A | 1/1987 | Ritter | 568/1 |
| 4,676,858 A | 6/1987 | Ritter | 156/307.3 |
| 4,920,188 A | 4/1990 | Sakashita | 526/196 |
| 4,921,921 A | 5/1990 | Ritter | 526/195 |
| 4,985,516 A | 1/1991 | Sakashita et al. | 526/196 |
| 5,034,464 A | 7/1991 | Arduengo | 525/207 |
| 5,106,928 A | 4/1992 | Skoultchi et al. | 526/196 |
| 5,143,884 A | 9/1992 | Skoultchi et al. | 502/160 |
| 5,286,821 A | 2/1994 | Skoultchi | 526/196 |
| 5,310,835 A | 5/1994 | Skoultchi et al. | 526/196 |
| 5,376,746 A | 12/1994 | Skoultchi | 526/196 |
| 5,401,805 A | 3/1995 | Chung et al. | 525/288 |
| 5,539,070 A | 7/1996 | Zharov et al. | 526/198 |
| 5,616,796 A | 4/1997 | Pocius et al. | 564/569 |
| 5,621,143 A | 4/1997 | Pocius | 564/568 |
| 5,681,910 A | 10/1997 | Pocius | 526/198 |
| 5,684,102 A | 11/1997 | Pocius et al. | 526/198 |
| 5,686,544 A | 11/1997 | Pocius | 526/196 |
| 5,690,780 A | 11/1997 | Zharov et al. | 156/332 |
| 5,691,065 A | 11/1997 | Zharov | 428/421 |
| 5,718,977 A | 2/1998 | Pocius | 428/422 |
| 5,795,657 A | 8/1998 | Pocius et al. | 428/516 |
| 5,872,197 A | 2/1999 | Deviny | 526/196 |
| 5,883,208 A | 3/1999 | Deviny | 526/198 |
| 5,912,433 A | 6/1999 | Pulido et al. | 174/77 |
| 5,935,711 A * | 8/1999 | Pocius et al. | 428/421 |
| 5,952,409 A | 9/1999 | Boardman et al. | 524/185 |
| 5,990,036 A | 11/1999 | Deviny | 502/162 |
| 5,994,484 A | 11/1999 | Pocius | 526/196 |
| 6,008,308 A * | 12/1999 | Pocius | 526/196 |
| 6,027,813 A | 2/2000 | Deviny | 428/422 |
| 6,093,778 A * | 7/2000 | Pocius | 526/196 |
| 6,383,655 B1 | 5/2002 | Moren | 428/522 |

FOREIGN PATENT DOCUMENTS

| | | |
|---|---|---|
| WO | WO 97/07151 | 2/1997 |
| WO | WO 97/07171 | 2/1997 |
| WO | WO 98/17694 | 4/1998 |
| WO | 9964475 | 12/1999 |

OTHER PUBLICATIONS

Love, Peter et al., "Polar Substituent Effects in Gas–Phase Lewis Acid–Base Equilibria. I. Intrinsic Basicity of Amines", J. Amer. Chem. Soc. (1968), 90(10), 2455–62 XP000982168, tables I, EX.5 columns 4 and 5.

Chemical Abstracts, Fujisawa, Seiichiro et al., "Dental Self–Curing Resins. XI. Characterization of Several Complexes of tri–n–butyl Borane as an Initiator" 73:88532, XP002160417–Abstract & Iyo Kizai Kenkyusho Hokoku, Tokyo Ika Shika Daigaku (1969), 3, pp. 64–71.

Koester, Roland et al., "Boron compounds, XXVII. Borylation of several amino carboxylic acids", Justus Liebigs Ann, Chem. (1974), (1), 112–19 XP000982170 pp. 112–113 (no translation provided).

Chemical Abstracts, vol. 119, 1993, p. 78, 119:74163c Acrylic Adhesive Composition and Organoborane Initiator System.

(List continued on next page.)

Primary Examiner—Tatyana Zalukaeva
(74) Attorney, Agent, or Firm—Norman L. Sims

(57) ABSTRACT

The invention is a two part composition useful for initiating cure of one or more polymerizable monomers which cure when exposed to free radicals comprising in one part an organoboraneamine complex and in a second part an isocyanate which is capable of decomplexing the organoborane complex wherein the ratio of amine nitrogen atoms to boron atoms is greater than 4.0:1.0. In another embodiment the invention is a two part polymerizable composition comprising part 1, a) an organoborane amine complex; and part 2, b) one or more of monomers, oligomers or polymers having olefinic unsaturation which is capable of polymerization by free radical polymerization c) an effective amount of a compound which causes the complex to disassociate thereby freeing the borane to initiate polymerization of the one or more monomers, oligomers or polymers having olefinic unsaturation wherein the compound which causes disassociation of the complex is kept separate from the complex until initiation of polymerization is desired; and d) a material which manages the heat of the polymerization reaction such that adhesion to the substrate is maintained, which material can be located in either part 1, part 2 or both parts.

21 Claims, 2 Drawing Sheets

OTHER PUBLICATIONS

Derwent Abstract, 96–453820/45, ADGE=May 28, 1993, Adgeziv Co. Ltd., RU 2054022–C1.
Polymer Letters, vol. 8, pp. 541–547 (1970) Polymerization of Methyl Methacrylate by Trialklborane–Pyridine System.
Journal of Organometallic Chemistry, Hoberg et al., 1976 118(1), C3–C5 (no translation provided).
ZH. Obschch. Khim., Dorokhov et al., 1976, 46(5), pp. 1053–1059.
Derwent Abstract, 119:74163 CA, CA2061021; N.V. Merlo et al.
Derwent Abstract, 1196–453820 [45], RU 2054022, Yu V. Zharov.

* cited by examiner

ORGANOBORANE AMINE COMPLEX POLYMERIZATION INITIATORS AND POLYMERIZABLE COMPOSITIONS

BACKGROUND OF THE INVENTION

This invention relates to compositions which contain organoborane amine complexes useful for initiating polymerization of compounds by free radical means. In another embodiment, this invention relates to polymerizable compositions comprising compounds containing moieties capable of free radical polymerization and organoborane amine complex initiators of the invention. In yet another embodiment the invention relates to a method of polymerizing compounds containing moieties capable of free radical polymerization.

In many practical situations in which compounds are subjected to polymerization or where adhesives are used, it is desirable to have polymerizable compositions and adhesive compositions which can cure on demand. Cure on demand means that the polymerization can be initiated when desired. A significant problem with cure on demand compositions is the stability of the compositions. Many such compositions will begin curing at, or near, ambient temperature or will partially cure at ambient temperature resulting in an increased viscosity causing difficulties in handling and reduced functionality of the polymerizable composition or adhesive composition.

Low surface energy olefins such as polyethylene, polypropylene and polytetrafluroethylene have a variety of attractive properties in a variety of uses, such as for toys, automobile parts, furniture applications and the like. Because of the low surface energy of these plastic materials, it is very difficult to find adhesive compositions which bond to these materials. The commercially available adhesives which are used for these plastics require time consuming or extensive pretreatment of the surface before the adhesive will bond to the surface. Such pretreatments include corona treatment, flame treatment and the like. The requirement for extensive pretreatment of the surface results in significant limitations to the designers of automobile components, toys, furniture and the like. What are needed are adhesive compositions which are capable of bonding to low surface energy substrates, and bonding low surface energy substrates to other substrates, without the need for extensive or costly pretreatment.

Mottus et al., U.S. Pat. No. 3,275,611 (incorporated herein by reference) discloses a process for polymerizing olefinic compounds with a catalyst comprising an organoborane compound, a peroxygen compound and an amine. It is disclosed that the organoborane compound and amine may be added to the reaction mixture separately or as a preformed complex, and that the complex is preferred. The presence of the amine in the complex reduces the pyrophoricity of the organoborane in air. Among the amine complexing agents disclosed are pyridine, aniline, toluidine, dimethylbenzylamine, and nicotine. Many of the complexes disclosed in Mottus are pyrophoric at all amine to boron atom ratios. In addition, many of the amine complexes do not display significant adhesive properties when applied to low surface energy substrates.

A series of patents issued to Skoultchi (U.S. Pat. Nos. 5,106,928, 5,143,884, 5,286,821, 5,310,835 and 5,376,746 (all incorporated herein by reference)) disclose a two-part initiator system that is useful in acrylic adhesive compositions. The first part of the two-part system includes a stable organoborane amine complex and the second part includes a destabilizer or activator such as an organic acid or an aldehyde. The organoborane compound of the complex has three ligands which can be selected from $C_{1-10}$ alkyl groups or phenyl groups. Useful amines disclosed include octylamine, 1,6-diaminohexane, diethylamine, dibutylamine, diethylenetriamine, dipropylenediamine, 1,3-propylene diamine, and 1,2-propylene diamine. The adhesive compositions are disclosed to be useful in structural and semi-structural adhesive applications, such as speaker magnets, metal to metal bonding, automotive glass to metal bonding, glass to glass bonding, circuit board component bonding, bonding select plastics to metal, glass to wood, etc. and for electric motor magnets.

Zharov et al. discloses in a series of U.S. Patents (U.S. Pat. No. 5,539,070; U.S. Pat. No. 5,690,780; and U.S. Pat. No. 5,691,065 (all incorporated herein by reference)) polymerizable acrylic compositions which are particularly useful as adhesives wherein organoborane amine complexes are used to initiate cure. The organoboranes used have three ligands attached to the borane atom which are selected from $C_{1-10}$ alkyl groups and phenyl. The amine is an alkanol amine, a linear alkyl diamine where the first amine group can be a primary or secondary amine and the second amine is a primary amine or an aromatic substituted alkyl amine. It is disclosed that these complexes are good for initiating polymerization of an adhesive which bonds to low surface energy substrates.

Pocius in a series of patents (U.S. Pat. No. 5,616,796; U.S. Pat. No. 5,621,143; U.S. Pat. No. 5,681,910; U.S. Pat. No. 5,686,544; U.S. Pat. No. 5,718,977; and U.S. Pat. No. 5,795,657 (all incorporated herein by reference) disclose amine organoborane complexes with a variety of amines such as polyoxyalkylene polyamines and polyamines which are the reaction product of diprimary amines and compound having at least two groups which react with a primary amine. Pocius U.S. Pat. No. 5,686,544 discloses a composition comprising an organoborane polyamine complex, polyol and an isocyanate decomplexing agent. It is disclosed that the primary amine to boron ratio in the complex is between about 4:1 and 1:1 and most preferred at about 1:1.

Many of the complexes disclosed in the Zharov, Skoultchi and Pocius Patents are not stable in compositions containing olefinic unsaturation at, or near, ambient temperatures and thus the complexes disassociate and induce polymerization at, or near, ambient temperature with time. This instability at, or near, ambient temperature can result in polymerization before desired and can result in compositions which are unsuitable for the desired use. Further, the compositions generally are two part compositions in which one side is a resin side and the other side is a hardener. One side (hardener) contains the organoborane complex and the other contains the decomplexing agent. In most cases the volume ratio of the two parts is significantly different, that is greater, than 4:1, often greater than 10:1. The problem is that most commercial equipment designed to dispense two part compositions utilizes ratios of 4:1 or less. In order to get these compositions to work in such equipment resin or nonreactive ingredients are added to one side or the other to get a suitable volumetric ratio. The problem is that if resin is added to the side containing the complex the mixture is unstable and could begin to cure at ambient temperatures and render the composition useless. If excessive inert materials are added to the hardener side the inert ingredient can act as a plasticizer or create a weak continuous phase and negatively impact the properties of the polymerized composition.

After polymerization many of the compositions of the prior art demonstrate excellent stability, strength and adhesion at or near ambient temperatures, but at elevated temperatures undergo loss of strength and adhesion at significantly elevated temperatures. This limits the environments where substrates bonded using these adhesives can be used.

Therefore, there is a need for initiator systems for free radical polymerization which are safe to handle, not pyrophoric, which can be used to form cure on demand polymer systems or can be used in adhesive systems which cure on demand. What is further needed are adhesive systems which are capable of bonding to low surface energy substrates, and initiator systems which facilitate such bonding. In addition to such needs, the complexes need to be thermally stable, that is do not disassociate at, or near, ambient temperatures and thereby initiate polymerization before desired. What are further needed are polymer compositions and adhesive systems which are thermally stable at, or near, ambient temperatures and which will undergo polymerization when the user desires. Further compositions that can be used in existing commercial equipment at mix ratios of 4:1 or less are needed. Compositions that have stability, strength and adhesion at elevated temperatures are desired.

SUMMARY OF INVENTION

The invention is a two part composition useful for initiating cure of one or more polymerizable monomers which cure when exposed to free radicals comprising in one part an organoborane amine complex and in a second part an isocyanate which is capable of decomplexing the organoborane complex wherein the ratio of amine nitrogen atoms to boron atoms is greater than 4.0:1.0.

In another embodiment the invention is a two part polymerizable composition comprising part 1, a) an organoborane amine complex wherein the ratio of amine nitrogen atoms to boron atoms is greater than 4.0:1; and part 2, b) one or more of monomers, oligomers or polymers having olefinic unsaturation which is capable of polymerization by free radical polymerization. In a preferred embodiment the second part (part 2) further comprises an effective amount of an isocyanate which causes the complex of part 1 to disassociate, freeing the borane to initiate polymerization of the one or more monomers, oligomers or polymers having olefinic unsaturation. In this embodiment the decomplexing agent and the complex are kept in separate parts to prevent premature reaction.

The invention is also a method of polymerization comprising contacting the components of the polymerizable composition under conditions such that the one or more monomers, oligomers, or polymers undergo polymerization. In one embodiment, the contacting occurs at, or near, ambient temperature. In another embodiment, the method further comprises the step of heating the polymerized composition to an elevated temperature under conditions such that the amine and isocyanate may further react. This can improve the temperature resistance of the polymerized composition.

In yet another embodiment the invention is a method of bonding two or more substrates together which comprises contacting the components of the polymerizable composition together under conditions such that polymerization is initiated; contacting the polymerizable composition with the two or more substrates; positioning the two or more substrates such that the polymerizable composition is located between the two or more substrates; and allowing the polymerizable composition to polymerize and to bond the two or more substrates together.

In yet another embodiment the invention is a method of coating a substrate composition which comprises contacting a composition comprising a) an organoborane amine complex wherein the ratio of amine nitrogen atoms to boron atoms is greater than 4.0:1 and b) one or more monomers, oligomers or polymers having olefinic unsaturation which are capable of polymerization by free radical polymerization with one or more surfaces of a substrate and heating the coating to initiate cure of the coating.

In another embodiment the invention is a method of coating a substrate wherein the coating composition comprises a) an organoborane amine complex wherein the ratio of amine nitrogen atoms to boron atoms is greater than 4.0:1 and b) one or more monomers, oligomers or polymers having olefinic unsaturation which are capable of polymerization by free radical polymerization; and c) a decomplexing agent.

In another embodiment the invention is a laminate comprising two substrates having disposed between the substrates and bound to each substrate a composition comprising a) an organoborane amine complex wherein the ratio of amine nitrogen atoms to boron atoms is greater than 4.0:1 and b) one or more monomers, oligomers or polymers having olefinic unsaturation which are capable of polymerization by free radical polymerization.

The composition in such laminate may further comprise a decomplexing agent.

In yet another embodiment the invention is a two part polymerizable composition comprising part 1, a) an organoborane amine complex; and part 2, b) one or more of monomers, oligomers or polymers having olefinic unsaturation which is capable of polymerization by free radical polymerization c) an effective amount of a compound which causes the complex to disassociate thereby freeing the borane to initiate polymerization of the one or more monomers, oligomers or polymers having olefinic unsaturation wherein the compound which causes disassociation of the complex is kept separate from the complex until initiation of polymerization is desired; and d) a material which manages the heat of the polymerization reaction such that adhesion to the substrate is maintained, which material can be located in either part 1, part 2 or both parts.

The complexes of the invention are safe to handle, i.e., not pyrophoric, are stable at, or near, ambient temperature and therefore will not initiate polymerization at, or near, ambient temperature in the absence of an initiator that causes the complex to disassociate. The polymeric compositions of the invention are stable at, or near, ambient temperature and can be cured upon demand by contacting the complex with the compounds which cause disassociation of the complex, or alternatively by heating the polymeric compositions above the thermal disassociation temperature of the complex. Furthermore, the polymerizable compositions of the invention can form good bonds to low surface energy substrates without the need for primers or surface treatment. These polymerizable compositions can be used as adhesives, coatings and can be used to laminate substrates together. The complexes and polymerizable compositions of the invention may be formulated to be dispensed in commercial equipment at volume ratios of the two parts of 4:1 or less. The polymerized compositions demonstrate excellent cohesive and adhesive strength at elevated temperatures and thus demonstrate excellent stability at high temperatures.

DETAILED DESCRIPTION OF THE INVENTION

Figure 1:
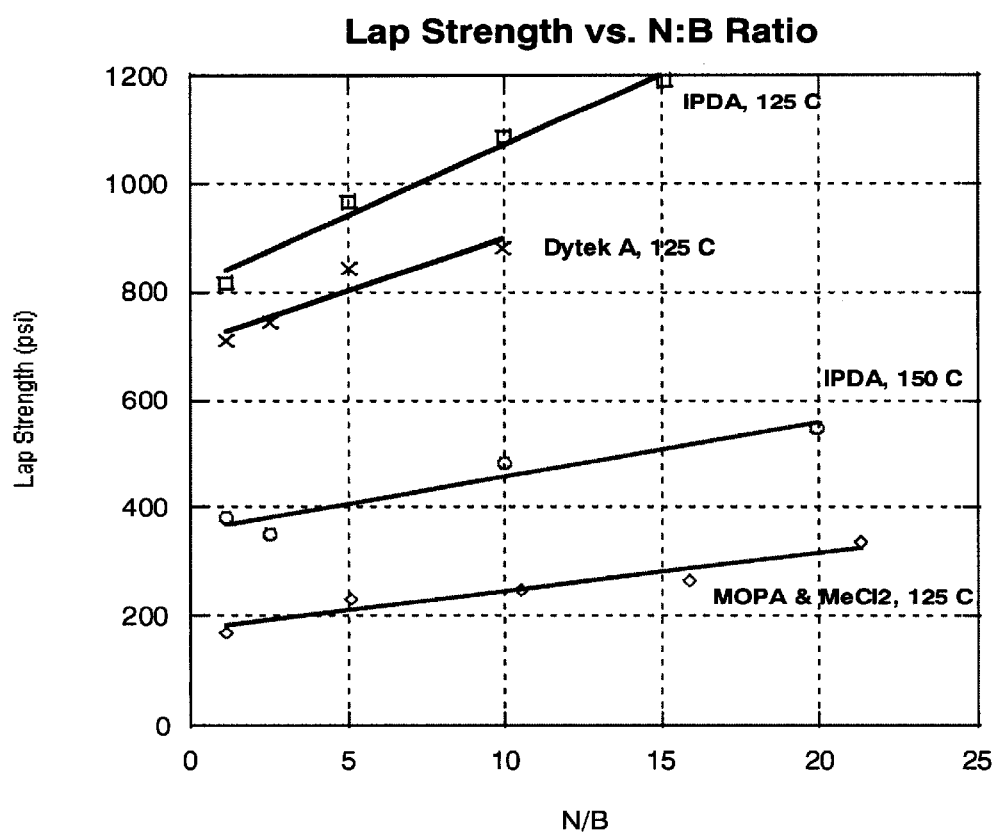
FIG. 1 illustrates the lap shear strengths of adhesives as a function of amine to boron atom ratio.

The organoborane used in the complex is a trialkyl borane or an alkyl cycloalkyl borane. Preferably such borane corresponds to Formula 1:

   Formula 1 wherein B represents Boron; and $R^2$ is separately in each occurrence a $C_{1-10}$ alkyl, $C_{3-10}$ cycloalkyl, or two or more of $R^2$ may combine to form a cycloaliphatic ring. Preferably $R^2$ is $C_{1-4}$ alkyl, even more preferably $C_{2-4}$ alkyl, and most preferably $C_{3-4}$ alkyl. Among preferred organoboranes are tri-ethyl borane, tri-isopropyl borane and tri-n-butylborane.

To prepare thermally stable polymerizable compositions, thermally stable complexes which do not disassociate, at or near, ambient temperature are needed. The key to preparation of such complexes, is the selection of the amine. The desirability of the use of a given amine in an organoborane amine complex can be calculated from the energy difference between the Lewis acid-base complex and the sum of energies of the isolated Lewis acid (organoborane) and base (amine) known as binding energy. The higher (more negative) the binding energy the more stable the complex.

Binding Energy=–(Complex Energy–(Energy of Lewis Acid+ Energy of Lewis base))

Such binding energies can be calculated using theoretical ab initio methods such as the Hartree Fock method and the 3-21G basis set. These computational methods are available commercially employing commercial software and hardware such as SPARTAN and GAUSSIAN 98 programs with a Silicon Graphics workstation. Amines having amineorganoborane binding energies of ten kilocalories per mol or greater are preferred, amines having a binding energy of 15 kilocalories per mol or greater are more preferred and even more preferred are amines with a binding 20 kilocalories per mol or greater. In the embodiment where polymerization of the compositions of the invention is initiated by use of a decomplexing agent the binding energy of the amine to the organoborane is preferably about 50 kcal/mole or less and most preferably about 30 kcal/mole or less. In the embodiment where polymerization of the compositions of the invention is initiated by use of heat the binding energy of the amine is preferably about 100 kcal/mole or less, more preferably about 80 kcal/mole or less and most preferably about 50 kcal/mole or less.

The amines used to complex the organoborane compound can be any amines or mixture of amines which complex the organoborane and which can be decomplexed when exposed to a decomplexing agent. Preferred amines include the primary or secondary amines or polyamines containing primary or secondary amine groups, or ammonia as disclosed in Zharov U.S. Pat. No. 5,539,070 at column 5 lines 41 to 53, incorporated herein by reference, Skoultchi U.S. Pat. No. 5,106,928 at column 2 line 29 to 58 incorporated herein by reference, and Pocius U.S. Pat. No. 5,686,544 column 7, line 29 to Column 10 line 36 incorporated herein by reference; ethanolamine, secondary dialkyl diamines or polyoxyalkylenepolyamines; and amine terminated reaction products of diamines and compounds having two or more groups reactive with amines as disclosed in Deviny U.S. Pat. No. 5,883,208 at column 7 line 30 to column 8 line 56, incorporated herein by reference. With respect to the reaction products described in Deviny the preferred diprimary amines include alkyl diprimary amines, aryl diprimary amines, alkyaryl diprimary amines and polyoxyalkylene diamines; and compounds reactive with amines include compounds which contain two or more groups of carboxylic acids, carboxylic acid esters, carboxylic acid halides, aldehydes, epoxides, alcohols and acrylate groups. Preferred amines include n-octylamine, 1,6-diaminohexane (1,6-hexane diamine), diethylamine, dibutyl amine, diethylene triamine, dipropylene diamine, 1,3-propylene diamine (1,3-propane diamine), 1,2-propylene diamine, 1,2-ethane diamine, 1,5-pentane diamine, 1,12-dodecanediamine, 2-methyl-1,5-pentane diamine, 3-methyl-1,5-pentane diamine, triethylene tetraamine, diethylene triamine. Preferred polyoxyalkylene polyamines include polyethyleneoxide diamines, polypropyleneoxide diamines, triethylene glycol propylene diamine, polytetramethyleneoxide diamine and polyethyleneoxidecopolypropyleneoxide diamines.

In one preferred embodiment, the amine comprises a compound having a primary amine and one or more hydrogen bond accepting groups, wherein there are at least two carbon atoms, preferably at least about three, between the primary amine and hydrogen bond accepting groups. Preferably, an alkylene moiety is located between the primary amine and the hydrogen accepting group. Hydrogen bond accepting group means herein a functional group that through either inter- or intramolecular interaction with a hydrogen of the borane-complexing amine increases the electron density of the nitrogen of the amine group complexing with the borane. Preferred hydrogen bond accepting groups include primary amines, secondary amines, tertiary amines, ethers, halogen, polyethers, thioethers and polyamines. In a preferred embodiment, the amine corresponds to Formula 2:

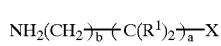   Formula 2 wherein:

$R^1$ is separately in each occurrence hydrogen, a $C_{1-10}$ alkyl, $C_{3-10}$ cycloalkyl or two or more of $R^1$ can form a cyclic ring structure which may have one or more cyclic rings; X is hydrogen bond accepting moiety; a is an integer of about 1 to about 10; and b is separately in each occurrence an integer of about 0 to about 1, and the sum of a and b is from about 2 to about 10. Preferably $R^1$ is hydrogen, methyl or two or more of $R^1$ combine to form a 5 or 6 membered cyclic ring. In a preferred embodiment X is a hydrogen accepting moiety with the proviso that when the hydrogen accepting moiety is an amine it is a tertiary or a secondary amine. More preferably X is separately in each occurrence —N(R$^8$)$_e$, —OR$^{10}$, —SR$^{10}$ or a halogen. R$^8$ is separately in each occurrence C$_{1-10}$ alkyl, C$_{3-10}$ cycloalkyl, —(C(R$^1$)$_2$)$_d$—W or two of R$^8$ may combine to form a structure having one or more cyclic rings. R$^{10}$ is separately in each occurrence, C$_{1-10}$ alkyl, C$_{3-10}$ cycloalkyl, or —(C(R$^1$)$_2$)$_d$—W. E is separately in each occurrence 0, 1, or 2; and most preferably e is 2. More preferably X is —N(R$^8$)$_2$ or —OR$^{10}$. Preferably, R$^8$ and R$^{10}$ are C$_{1-4}$ alkyl or —(C(R$^1$)$_2$)$_d$—W, more preferably C$_{1-4}$ alkyl and most preferably methyl. W is separately in each occurrence hydrogen or C$_{1-10}$ alkyl or X and more preferably hydrogen or C$_{1-4}$ alkyl. Preferably, a is about 1 or greater and more preferably about 2 or greater. Preferably a is about 6 or less, and most preferably about 4 or less. Preferably, b is about 1. Preferably, the sum of a and b is an integer about 2 or greater and most preferably about 3 or greater. Preferably the sum of a and b are about 6 or less and more preferably about 4 or less. Preferably d is separately in each occurrence an integer of about 1 to about 4, more preferably about 2 to about 4, and most preferably about 2 to about 3. Among preferred amines corresponding to Formula 2 are dimethylaminopropyl amine, methoxypropyl amine, dimethylaminoethylamine, dimethylaminobutylamine, methoxybutyl amine, methoxyethyl amine, ethoxypropylamine, propoxypropylamine, amine terminated polyalkylene ethers (such as trimethylolpropane tris(poly (propyleneglycol), amine terminated)ether), and aminopropylpropanediamine.

In one embodiment the preferred amine complex corresponds to Formula 3:

Formula 3

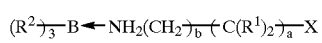

wherein R$^1$, R$^2$, X, a and b are as defined hereinbefore.

In another embodiment the amine is an aliphatic heterocycle having at least one nitrogen in the heterocycle. The heterocyclic compound may also contain one or more of nitrogen, oxygen, sulfur or double bonds. In addition, the heterocycle may comprise multiple rings wherein at least one of the rings has a nitrogen in the ring. Preferably the aliphatic heterocyclic amine corresponds to Formula 4:

Formula 4

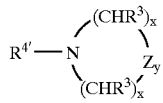

wherein:

R$^3$ is separately in each occurrence hydrogen, a C$_{1-10}$ alkyl C$_{3-10}$ cycloalkyl or forms a double bond with an adjacent atom. R$^{4'}$ is separately in each occurrence hydrogen, C$_{1-10}$ alkyl or forms a cyclic ring with an R$^3$, Z or a substituent on Z. Z is separately in each occurrence sulfur, oxygen or —NR$^4$. R$^4$ is separately in each occurrence hydrogen, C$_{1-10}$ alkyl, or C$_{6-10}$ aryl or C$_{7-10}$ alkaryl. X is separately in each occurrence an integer of about 1 to about 10, with the proviso that the total of all occurrences of x should be from about 2 to about 10. Y is separately in each occurrence 0 or 1. Two or more of R$^3$, R$^4$, and R$^{4'}$ may combine to form cyclic rings thereby forming a multicyclic compound. Preferably, R$^3$ is separately in each occurrence hydrogen, methyl or forms a double bond with an adjacent atom. Preferably Z is NR$^4$. Preferably, R$^4$ is hydrogen or C$_{1-4}$ alkyl, and more preferably hydrogen or methyl. Preferably, R$^{4'}$ is hydrogen or C$_{1-4}$ alkyl, more preferably hydrogen or methyl and most preferably hydrogen. Preferably x is from about 1 to about 5 and the total of all the occurrences of x is about 3 to about 5. Preferred compounds corresponding to Formula 4 include morpholine, piperidine, pyrolidine, piperazine, 1,3,3 trimethyl 6-azabicyclo[3,2,1] octane, thiazolidine, homopiperazine, aziridine, 1-amino-4-methylpiperazine, 3-pyrroline, aminopropyl morpholine and the like. Complexes containing aliphatic heterocyclic amines preferably correspond to Formula 5:

Formula 5

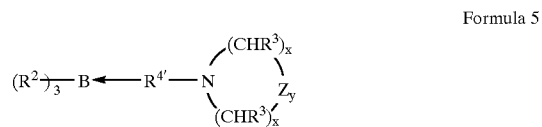

wherein R$^2$, R$^3$, R$^{4'}$, Z, x and y are as defined hereinbefore.

In yet another embodiment, the amine which is complexed with the organoborane is an amidine. Any compound with amidine structure wherein the amidine has sufficient binding energy as described hereinbefore with the organoborane, may be used. Preferable amidine compounds correspond to Formula 6:

Formula 6

wherein:

R$^5$ separately in each occurrence hydrogen, a C$_{1-10}$ alkyl, or C$_{3-10}$ cycloalkyl. R$^6$ is separately in each occurrence hydrogen, a C$_{1-10}$ alkyl, C$_{3-10}$ cycloalkyl or N(R$^5$)$_2$. Two or more of R$^5$, R$^6$, and R$^7$ may combine in any combination to form a ring structure, which may have one or more rings. Preferably R$^5$ is separately in each occurrence hydrogen, C$_{1-4}$ alkyl or C$_{5-6}$ cycloalkyl. Preferably R$^6$ is separately in each occurrence hydrogen, C$_{1-4}$ alkyl or C$_{5-6}$ cycloalkyl or N(R$^5$)$_2$. More preferably R$^6$ is separately in each occurrence C$_{1-4}$ alkyl or C$_{5-6}$ cycloalkyl or N(R$^5$)$_2$ Preferably R$^7$ is separately in each occurrence hydrogen, C$_{1-10}$ alkyl, C$_{3-10}$ cycloalkyl or part of a ring structure. Most preferably R$^7$ is hydrogen, methyl or part of a cyclic ring. In the embodiment where two or more of R$^5$, R$^6$ and R$^7$ combine to form a ring structure, the ring structure is preferably a single or a double ring structure. Among preferred amidines are 1,1,3,3-tetramethylguanidine, 1,8 diazobicyclo[5,4]undec-7ene; tetrahydropyrimidine; 2-methyl-2-imidazoline and the like.

The organoborane amidine complexes preferably correspond to Formula 7:

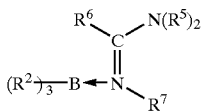

Formula 7 wherein $R^2$, $R^5$, $R^6$ and $R^7$ are as defined earlier.

In yet another embodiment, the amine which is complexed with the organoborane is a conjugated imine. Any compound with a conjugated imine structure, wherein the imine has sufficient binding energy as described hereinbefore with the organoborane, may be used. The conjugated imine can be a straight or branched chain imine or a cyclic imine. Preferable imine compounds correspond to Formula 8:

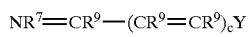

Formula 8

$$NR^7=CR^9-(CR^9=CR^9)_cY$$

wherein Y is independently in each occurrence hydrogen, $N(R^4)_2$, $OR^4$, $C(O)OR^4$, halogen, an alkylene group which forms a cyclic ring with $R^7$ or $R^9$. $R^9$ is independently in each occurrence hydrogen, Y, $C_{1-10}$ alkyl, $C_{3-10}$ cycloalkyl-, $(C(R^9)_2-(CR^9=CR^9)_c-Y$ or two or more of $R^9$ can combine to form a ring structure provided the electron rich group in Y is conjugated with respect to the double bond of the imine nitrogen; and c is an integer of from about 1 to about 10. Preferably, $R^9$ is hydrogen or methyl.

Y is preferably $N(R^4)_2$, $SR^4$, $OR^4$, or an alkylene group which forms a cyclic ring with $R^9$. Y is more preferably $N(R^4)_2$ or an alkylene group which forms a cyclic ring with $R^9$. Preferably, c is an integer of from about 1 to about 5, and most preferably about 1. Among preferred conjugated imines useful in this invention are 4-dimethylaminopyridine; 2,3-bis(dimethylamino)cyclopropeneimine; 3-(dimethylamino)acroleinimine; 3-(dimethylamino) methacroleinimine, and the like.

Among preferred cyclic imines are those corresponding to the following structures

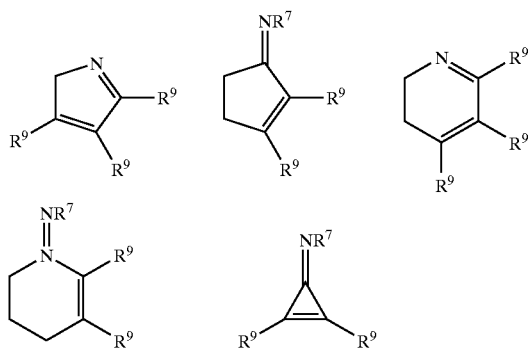

The complexes with the conjugated imines preferably correspond to Formula 9:

Formula 9 wherein $R^2$, $R^7$, $R^9$, c and Y are as defined hereinbefore.

In another embodiment the amine can be an alicyclic compound having bound to the alicyclic ring a substituent containing an amine moiety. The amine containing alicyclic compound may have a second substituent which contains one or more nitrogen, oxygen, sulfur atoms or a double bond. The alicyclic ring can contain one or two double bonds. The alicyclic compound may be a single or multiple ring structure. Preferably the amine on the first substituent is primary or secondary. Preferably the alicyclic ring is a 5 or 6 membered ring. Preferably functional groups on the second substituent are amines, ethers, thioethers or halogens. In a preferred embodiment the alicyclic compound with one or more amines containing substituent corresponds to Formula 10

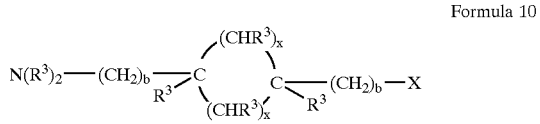

Formula 10 wherein $R^3$, X, b and x are as described hereinbefore. Included in amine substituted alicyclic compounds is isophorone diamine and isomers of bis(aminoethyl cyclohexane.

Complexes using amine substituted alicyclic compounds correspond to Formula 11

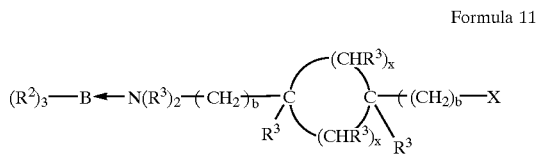

Formula 11 wherein $R^2$, $R^3$, X, b and x are as defined hereinbefore.

The equivalent ratio of amine compound(s) to borane compound in the complex is relatively important. An excess of amine is preferred to allow balancing of the volume of the resin side and the hardener side of the polymerizable compositions described herein. Further increasing the amine content further stabilizes the organoborane amine complex. Also the amine reacts with the decomplexing agent to produce a thermally stable urea polyurea or polyurea/ urethane. Preferably the equivalent ratio of amine compound to organoborane compound is about 4.0:1.0 or greater. More preferably the equivalents ratio of amine compound to organoborane compound is greater than about 4.0:1.0, even more preferably about 5.0:1.0 or greater and most preferably about 6.0:1 or greater. The upper limit on the amount of amine is based on practicality, the amount of heat generated by the reaction of the amine and the isocyanate decomplexing agent, and on the amount of the decomplexing agent present as discussed hereinafter. More preferably the equivalent ratio of amine compound to organoborane compound is about 20.0:1.0 or less and most preferably about 16.0:1.0 or less.

Polymerizable compounds which may be used in the polymerization compositions of the invention include any monomers, oligomers, polymers or mixtures thereof which contain olefinic unsaturation which can polymerize by free radical polymerization. Such compounds are well known to those skilled in the art. Mottus, U.S. Pat. No. 3,275,611, provides a description of such compounds at column 2, line 46 to column 4, line 16, incorporated herein by reference. Among preferred classes of compounds containing olefinic unsaturation are monomers, oligomers, polymers and mixtures thereof derived from the acrylates and methacrylates; olefinically unsaturated hydrocarbons, for example ethylene, propylene, butylene, isobutylene, 1-octene, 1-dodecene, 1-heptadecene, 1-eicosene and the like; vinyl compounds such as styrene, vinyl pyridine, 5-methyl-2-vinylpyridine, vinyl napthylene, alpha methylstyrene; vinyl and vinylidiene halides; acrylonitrile and methacrylonitrile; vinyl acetate and vinyl propionate; vinyl oxyethanol; vinyl trimethylacetate; vinyl hexonate; vinyl laurate; vinyl chloroacetate; vinyl stearate; methyl vinyl ketone; vinyl isobutyl ether; vinyl ethyl ether; compounds that have a plurality of ethylenic bonds such as those having conjugated double bonds such as butadiene, 2-chlorobutadiene, isoprene; and the like. Examples of preferable acrylates and methacrylates are disclosed in Skoultchi, U.S. Pat. No. 5,286,821 at column 3, lines 50 to column 6, line 12, incorporated herein by reference and Pocius, U.S. Pat. No. 5,681,910 at column 9, line 28 to column 12, line 25, incorporated herein by reference. More preferred olefinic compounds comprise methyl acrylate, methylmethacrylate, butylmethacrylate, tert-butylmethacrylate, 2-ethylhexyacrylate, 2-ethylhexylmethacrylate, ethylacrylate, isobornylmethacrylate, isobornylacrylate, hydroxyethylmethacrylate, glycidylmethacrylate, tetrahydrofurfuryl methacrylate, acrylamide, n-methylacrylamide, and other similar acrylate containing monomers. Also useful are the class of acrylate tipped polyurethane prepolymers available commercially from several sources, and prepared by reacting an isocyanate reactive acrylate monomer, oligomer or polymer, such as a hydroxy acrylate, with an isocyanate functional prepolymer.

In the embodiment where the composition is used as an adhesive, acrylate and/or methacrylate based compounds are preferably used. The most preferred acrylate and methacrylate compounds include methylmethacrylate, butylmethacrylate, 2-ethylhexylmethacrylate, isobornylmethacrylate, tetrahydrofurfuryl methacrylate, and cyclohexylmethylmethacrylate.

Preferably the polymerized composition of the invention is capable of forming a polymer that exhibits high temperature resistance. High temperature resistance means the polymer does not appreciably soften or undergo degradation at elevated temperatures. Preferably the polymer is capable of withstanding temperatures of 10° C. in excess of their expected maximum use temperature. Preferably such use temperature is about 60° C. or greater and more preferably about 90° C. or greater. Preferred monomers which prepare polymers with high temperature resistance are methyl methacrylate (MMA), and isobornyl methacrylate. Preferred high temperature polymers are sPMMA (syndiotactic polymethylmethacrylate), PMMA (polymethylmethacrylate), polyisobornyl methacrylate, polyacrylamide and crosslinked (meth)acrylic polymers.

The compositions of the invention further comprises an effective amount of an isocyanate containing compound (a decomplexing agent) that is reactive with the complexed amine so as to liberate the organoborane and to initiate polymerization. The amine reactive compound liberates organoborane by reacting with the amine, thereby removing the organoborane from chemical attachment with the amine. Desirable decomplexing agents are those isocyanates which can readily form reaction products with amines at, or below, and more preferably at room temperature, i.e., about 20° C. to 22° C., so as to provide a composition that can be easily used and cured under ambient conditions. Preferably the amount of isocyanate containing compound present is sufficient to cause the organoborane amine complexes present in the composition to decomplex. Preferably there is sufficient isocyanate containing compound present to react with all of the amine present. Excess amine can plasticize the polymer formed and thus compromise the properties of the polymers formed. Preferably an excess of isocyanate is present as compared to the free total amount of active hydrogens (typically, primary and secondary amine and hydroxy groups) in the organoborane amine complex. Preferably the ratio of isocyanate equivalents to amine equivalents is about 1.0:1.0 or greater, more preferably about 1.1:1.0 or greater and most preferably about 1.25:1 or greater as used here, this refers to any free amine and to complexed amine present. The isocyanate containing compounds react with the amine present in the composition to form a urea, polyurea or polyurethane/urea phase. When an excess of isocyanate containing compound is used, little or no free amine is present in the resulting product. By eliminating the presence of free amine the plasticizing impact of the amine is prevented. Further the urea or polyurea present improves the heat resistance of the resulting product. Preferably the amount of urea or polyurea present in the resulting polymerized product is about 5 percent by weight or greater, more preferably about 10 percent or greater, and most preferably about 15 percent or greater. Preferably the amount of polyurea present in the resulting polymerized product is about 50 percent or less, more preferably about 45 percent or less and most preferably about 40 percent or less. Percent urea means the percent by weight of the urea/urethane phase in the final product. This can be generally determined by adding the weight of the isocyanate and amine (and any other isocyanate reactive compounds present) and dividing this sum by the total weight of the ingredients.

In one embodiment the polymer or adhesive formulation of the invention may further contain one or more compounds which have more than one, preferably two or more, moieties reactive with isocyanates. Generally, in addition to amines, moieties which contain active hydrogen atoms are reactive with isocyanate groups, such moieties include hydroxyl, carboxylate, and thiol moieties. After amines, the more preferred active hydrogen moieties are hydroxyl moieties. The preferred hydroxyl containing compounds are polyols and aminols. Any polyol useful for reacting with isocyanates may be used. Preferably, primary and secondary amines are the only compounds that are present to react with the isocyanate containing compounds. Preferably the isocyanate containing compound is any isocyanate compound that decomplexes the organoborane amine complex. Preferably the isocyanate is a polyisocyanate having nominally 2 or greater isocyanate moieties per compound. Isocyanate compounds useful are disclosed in Deviny U.S. Pat. No. 5,872,197, Column 4 line 57 to column 5 line 65, incorporated herein by reference. Among more preferred isocyanate containing compounds are polymeric versions of methylene diphenyl diisocyanate, isophorone diisocyanate, hexamethylene diisocyanate, toluene diisocyanate, isomers or bis isocyanatomethyl cyclohexane, tetramethylxylyl diisocyanate, and the like.

Preferably the amount of polymerizable compounds in the polymerizable compositions or adhesive is about 20 percent by weight or greater based on the weight of the total composition, more preferably about 30 percent by weight or greater and most preferably about 40 percent by weight or greater. Preferably the amount of polymerizable compounds is about 95 percent by weight or less, preferably about 90 percent by weight or less and most preferably about 85 percent by weight or less. The amount of complex used in the composition can be any amount sufficient to initiate polymerization once the complex has disassociated. At higher concentration of organoborane, the speed of polymerization is generally higher. Preferably the amount of organoborane complex present is sufficient to provide the amount of boron of about 0.02 percent by weight or greater based on the weight of the total composition and more preferably about 0.05 percent by weight or greater. Preferably the amount of organoborane complex present is sufficient to provide the amount of boron of about 1 percent by weight or less based on the total weight of composition, preferably about 0.7 percent by weight or less and most preferably about 0.4 percent by weight or less.

Preferably the amount of isocyanate present is about 80 equivalents percent or greater based on the equivalents of amine present, both complexed and free, more preferably about 100 equivalents percent or greater and most preferably about 110 equivalents percent or greater.

Preferably the equivalent ratio of amine to isocyanate is 1.25:1.0 or less and more preferably is about 1.0:1.0 or less.

The organoborane amine complex may be readily prepared using known techniques. Typically, the amine is combined with the organoborane in an inert atmosphere with stirring. An exotherm is often observed and cooling of the mixture is, therefore, recommended. If the ingredients have a high vapor pressure, it is desirable to keep the reaction temperature below about 70° C. to 80° C. Once the materials are well mixed the complex is permitted to cool to room temperature. The solvent is then removed. No special storage conditions are required although it is preferred that the complex be kept in a capped vessel under an inert atmosphere, in a cool, dark location. Advantageously, the complexes of the invention can be prepared in the absence of organic solvents that would later have to be removed, although they could be prepared in solvent, if so desired. Solvents used in the preparation of the complexes should, preferably, be ones that do not coordinate the amine, preferable solvents are, for example, tetrahydrofuran or diethylether, or low molecular weight alkanes such as hexane or heptane.

The complexes useful in the invention are air stable. By "air stable" it is meant that when the complexes are stored in a capped vessel at room temperature (about 20° C. to 22° C.) and under otherwise ambient conditions (i.e., not under a vacuum and not in an inert atmosphere), the complexes remain useful as polymerization initiators for at least about two weeks, although the complexes may be readily stored under these conditions for many months.

By "air stable" it is also meant that the complexes are not pyrophoric. (When a few drops of the complex are placed on a paper towel under ambient conditions, the paper towel does not ignite, char or smoke.) The air stability of the complex is enhanced when the complex is a crystalline material. However, the complexes of the invention are air stable for at least six months even when they are liquids. Liquid complexes are easier to handle and mix than are crystalline complexes.

The polymerizable compositions of the invention are two-part compositions. In one embodiment the compositions are two-part compositions in which one-part contains the complexes of the invention and the other part contains the decomplexing agent (initiator). Polymerization is initiated by contacting the two-parts of the composition. Polymerization can be initiated at, or even below, ambient temperatures. Heat may be applied to the polymerizable composition to speed up initiation or polymerization and to aid in the reaction of the isocyanate compound present with the active hydrogen containing compounds. The primary reason to use a two-part composition is to keep apart components of the composition which may be unstable in the presence of one another.

In the embodiment where heat is used to effect the cure of the composition, the composition is exposed to a heat source which heats the composition to a temperature at or above the temperature at which the complex used in the composition decomposes to release the organoborane which then initiates free radical polymerization. Generally the composition is heated to a temperature which is less than the temperature at which the monomer undergoes spontaneous polymerization. The temperature at which the complex undergoes disassociation is related to the binding energy of the complex. At higher binding energies of the complex higher temperatures are required to initiate polymerization.

Where the binding energy of the complex is high, polymerization may be initiated thermally. The temperature at which the composition is heated to initiate polymerization is dictated by the binding energy of the complex. Generally the temperature used to initiate the polymerization by decomplexing the complex is about 30° C. or greater and preferably about 50° C. or greater. Preferably the temperature at which thermally initiated polymerization is initiated is about 120° C. or less and more preferably about 100° C. or less. Any heat source which heats the composition to the desired temperature can be used, provided the heat source does not negatively impact the components of the composition or its function. In this manner the composition may be contacted with the substrates either before or after the composition is exposed to heat. If the composition is heated prior to contact with the substrates, the composition should be contacted with the substrates before the composition has polymerized to the point at which the composition is no longer able to adhere to the substrates. It may be necessary in the thermally initiated reaction to control the oxygen content such that there is adequate oxygen to create favorable conditions for radical formation but not so much as to inhibit the polymerization.

If heat is used (in addition to an initiator) to enhance cure, the applied heat can be applied immediately or delayed (that is applied after some time of cure at room temperature). If a delayed heating or post-cure heating is used, the polymerized composition may be exposed to temperatures as high as, or slightly higher than, the expected maximum use temperature. Preferably, any delayed heating is applied after sufficient strength has been achieved in the cured compound at room temperature. If heat is applied immediately to the curing compound to accelerate the cure, then this heat is preferably less than or approximately equal to the dissociation temperature of the organoborane amine complex.

The two-part polymerizable compositions or adhesive compositions of the invention are uniquely suited for use with conventional, commercially available dispensing equipment for two-part adhesives. Once the two-parts have been combined, the composition should be used quickly, as the useful pot life (open time) may be short depending upon the monomer mix, the amount of complex, and the temperature at which the bonding is to be performed. The adhesive composition is applied to one or both substrates and then the substrates are joined together, preferably with pressure to force excess composition out of the bond line. In general, the bonds should be made shortly after the composition has been applied, preferably within about 10 minutes. The typical bond line thickness is about 0.005 inches (0.13 mm) to about 0.03 inches (0.76 mm). The bond line can be thicker if gap filling is needed as the composition of the invention can function as both an adhesive and a gap filler. The bonding process can easily be carried out at room temperature and to improve the degree of bonding it is desirable to keep the temperature below about 40° C., preferably below about 30° C., and most preferably below about 25° C.

The bonds will cure to a reasonable green strength to permit handling of the bonded components within about 0.5 to 3 hours. Full strength will be reached in about 24 hours under ambient conditions. Post-curing with heat may be used if desired. After polymerization of the olefinic compound has been initiated, the composition of the invention may be exposed to conditions to cause the polyisocyanate to react additionally with the isocyanate reactive compound. Preferably this reaction is initiated by exposing the composition to temperatures at which the polyisocyanate reacts with the isocyanate reactive compounds. In another embodiment the composition may contain a catalyst for the reaction of an isocyanate with an isocyanate reactive compound. Such catalysts are well known in the art. Temperatures for post curing are preferably about 25° C. or greater and more preferably about 30° C. or greater and most preferably about 35° C. or greater.

The compositions may further comprise a variety of optional additives. One particularly useful additive is a thickener such as medium to high (about 10,000 to about 1,000,000) molecular weight polymethyl methacrylate which may be incorporated in an amount of about 10 to about 60 weight percent, based on the total weight of the composition. Thickeners may be employed to increase the viscosity of the composition to facilitate application of the composition.

Another particularly useful additive is an elastomeric material. The materials may improve the fracture toughness of compositions made therewith which can be beneficial when, for example, bonding stiff, high yield strength materials such as metal substrates that do not mechanically absorb energy as easily as other materials, such as flexible polymeric substrates. Such additives can be incorporated in an amount of about 5 percent to about 35 percent by weight, based on the total weight of the composition. Useful elastomeric modifiers include chlorinated or chlorosulphonated polyethylenes such as HYPALON 30 (commercially available from E. I. Dupont de Nemours & Co., Wilmington, Del.) and block copolymers of styrene and conjugated dienes (commercially available from Dexco Polymers under the Trademark VECTOR, and Firestone under the Trademark STEREON). Also useful, and even more preferred, are certain graft copolymer resins such as particles that comprise rubber or rubber-like cores or networks that are surrounded by relatively hard shells, these materials often being referred to as "core-shell" polymers. Most preferred are the acrylonitrile-butadiene-styrene graft copolymers available from Rohm and Haas. In addition to improving the fracture toughness of the composition, core-shell polymers can also impart enhanced spreading and flow properties to the uncured composition. These enhanced properties may be manifested by a reduced tendency for the composition to leave an undesirable "string" upon dispensing from a syringe-type applicator, or sag or slump after having been applied to a vertical surface. Use of more than about 20 percent of a core-shell polymer additive is desirable for achieving improved sag-slump resistance. Generally the amount of toughening polymer used is that amount which gives the desired toughness to the polymer or the adhesive prepared.

In a preferred embodiment the compositions of the invention contain a heat management material. Any material which functions to dissipate heat during polymerization, may be used. Examples of useful heat management materials include volatile liquids which evaporate during the reaction as a result of absorbing heat generated during the reaction, materials which function as heat sinks by absorbing generated heat and materials which react via an endothermic reaction under conditions of the reaction. Materials useful as heat sinks are materials with high heat capacities. Examples of materials with high heat capacities include ceramic particles, glass beads, fluoropolymer powders, and hollow spheres. Useful liquid materials include, chlorinated alkanes, dialkyl ethers, alkanes, methylene chloride and low boiling petroleum ethers. More preferred solvents include methylene chloride, diethyl ether, pentane, hexane and the like. The amount of heat management material used is dependent on the target reaction temperature and the heat capacity of the heat management material. One skilled in the art can readily determine the necessary amount of the heat management material. The heat of reaction can also be impacted by slowing down the rate of mixing thereby allowing for slower heat generation. Preferably the average temperature of the adhesive over its' working time is managed to a target of about 70° C. or less, preferably about 60° C. or less and most preferably about 50° C. or less. The heat management material can be placed on either the resin side of the formulation or on the hardener side. The selection of the heat management material and the amount of the heat management material are driven by the amount of heat that needs to be dissipated during the polymerization. If the heat generated during the reaction is too high for too long of a period of time, the adhesion of the polymerized composition to a substrate may be negatively impacted. It is desirable to limit the amount of heat induced decomplexation of the organoborane amine complex. If the complex decomplexes too rapidly adhesion is negatively impacted. In one embodiment where heat management materials are used, the ratio of the nitrogen atoms to the boron atoms can be any workable ratio. Further where the heat management materials are used any of the known organoborane amine complexes and dissociation agents can be used.

Another useful adjuvant is a cross-linking agent. Cross-linking agents can be used to enhance the solvent resistance of the adhesive bond or polymer composition, although certain compositions of the invention have good solvent resistance even in the absence of externally added cross-linking agents. The crosslinking agent can increase the use temperature and the solvent resistance of the cured polymer or adhesive. Typically employed in an amount of about 0.2 to about 10 weight percent based on the total weight of the compositions, useful cross-linkers include the various diacrylates, referred to above as possible acrylic modifying monomers, and compounds with both acrylate and isocyanate functionality as well as other materials. Particular examples of suitable cross-linking agents include ethylene glycol dimethacrylate, ethylene glycol diacrylate, triethyleneglycol dimethacrylate, diethylene glycol bismethacryloxy carbonate, polyethylene glycol diacrylate, tetraethylene glycol dimethacrylate, diglycerol diacrylate, diethylene glycol dimethacrylate, pentaerythritol triacrylate, trimethylolpropane tris(2-methyl-1-aziridinepropionate, trimethylolpropane trimethacrylate, acrylate tipped polyurethane containing prepolymers, polyether diacrylates and dimethacrylates.

Peroxides may be optionally included (typically in an amount of about 2 percent by weight or less, based on the total weight of the composition), for example, to adjust the speed at which the compositions polymerize or to complete the polymerization.

Small amounts of inhibitors such as hindered phenols (i.e. 2,6-di-tert-butyl-4-methylphenol, may be used, for example, to prevent or reduce degradation of the olefinic monomers during storage. Inhibitors may be added in an amount that does not materially reduce the rate of polymerization or the ultimate properties of an adhesive or other composition made therewith, typically about 10 to about 10,000 ppm based on the weight of the polymerizable monomers.

The composition may also contain known catalyst for the reaction of an isocyanate reactive compound with an isocyanate containing compound. Such catalysts are well known in the art and are disclosed at Chaio U.S. Pat. No. 5,623,044 at column 6 line 1 to line 12, incorporated herein by reference.

The composition of the invention may contain a reactive or nonreactive diluent to balance the volume of the two parts of the composition so as to achieve a commercially acceptable volumetric ratio of the two components. Preferably the diluent is a reactive diluent. Preferred reactive diluents are isocyanate reactive compounds because they react with the polyisocyanate to form a polyurea and/or a polyurethane phase. Representatives of this class of additive would be low equivalent weight alcohols, amines, aminols, polyamines, polyols or mixtures thereof. These reactive additives react with the isocyanate (decomplexing agent) and thus the amount of isocyanate must be increased to accommodate these additives. The polyurea/polyurethane phase can improve the properties of the final product. Generally this phase can increase the glass transition temperature of the polymeric adhesive formed. The properties of the final cured composition can be adjusted by selection of the polyisocyanate and the isocyanate reactive compound.

Other possible additives include non-reactive colorants, fillers, solvents etc. Solvents should be selected to have boiling points below the thermal dissociation temperature of the organoborane amine complex. The use of an excess of a nonreactive diluent can negatively impact certain properties of the polymerized composition such as tensile strength, thermal resistance and elongation.

The various optional additives are employed in an amount that does not significantly adversely affect the polymerization process or the desired properties of compositions made therewith.

Polymerizable compositions according to the invention may be used in wide variety of ways, including as sealants, coatings, primers, to modify the surface of polymers, and injection molding resins. They may also be used as matrix resins in conjunction with glass and metal fiber mats such as in resin transfer molding operations. They may further be used as encapsulants and potting compounds such as in the manufacture of electrical components, printed circuit boards and the like. Quite desirably, they provide polymerizable adhesive compositions that can bond a diverse myriad of substrates, including polymers, wood, ceramics, concrete, glass and primed metals. Another desirable related application is their use in promoting adhesion of paints to low surface energy substrates such as polyethylene, polypropylene, polyethyleneterephthalate and polytetrafluoroethylene, and their co-polymers. In this embodiment the composition may be coated onto the surface of the substrate to modify the surface to enhance the adhesion of the final coating to the surface of the substrate or added to the coating itself.

The compositions of the invention can be used in coating applications. In such applications the composition may further comprise a carrier such as a solvent. The coating may further contain additives well known to those skilled in the art for use coatings such as pigments to color the coating, inhibitors and UV stabilizers. The compositions may also be applied as powder coatings and may contain the additives well known to those skilled in the art for use in powder coatings.

The compositions of the invention can also be used to modify the surface of a polymeric molded part, extruded film or contoured object. Compositions of the invention can also be used to change the functionality of a polymer particle by surface grafting of polymer chains on to the unmodified plastic substrate.

Polymerizable compositions of the invention are especially useful for adhesively bonding low surface energy plastic or polymeric substrates that historically have been very difficult to bond without using complicated surface preparation techniques, priming, etc. By low surface energy substrates is meant materials that have a surface energy of about 45 mJ/m$^2$ or less, more preferably about 40 mJ/m$^2$ or less and most preferably about 35 mJ/m$^2$ or less. Included among such materials are polyethylene, polypropylene, acrylonitrile-butadiene-styrene, polyamides, syndiotactic polystyrene, olefin containing block co-polymers, and fluorinated polymers such as polytetrafluoroethlene (TEFLON) which has a surface energy of less than about 20 mJ/m$^2$. (The expression "surface energy" is often used synonymously with "critical wetting tension" by others.) Other polymers of somewhat higher surface energy that may be usefully bonded with the compositions of the invention include polycarbonate, polymethylmethacrylate, and polyvinylchloride.

The polymerizable compositions of the invention can be easily used as a two-part adhesive. The components of the polymerizable compositions are blended as would normally be done when working with such materials. The decomplexing agent is usually included in this blend so as to separate it from the organoborane amine complex, thus providing one-part of the two-part composition. The organoborane amine complex of the polymerization initiator system provides the second part of the composition and is added to the first part shortly before it is desired to use the composition. The complex may be added to the first part directly or it may be pre-dissolved in an appropriate carrier such as a reactive diluent or monomer, i.e., methyl methacrylate or a MMA/PMMA viscous solution or to a non-reactive diluent, such as a solvent, just prior to addition to the first part.

It may be desirable to store the complexes apart from the monomers, oligomers or polymers to inhibit premature polymerization of the monomers, oligomers or polymers. The complexes of this invention have greatly enhanced stability when in the presence of monomers and in the absence of a decomplexing agent, and thus can be stored with the polymerizable components of the composition.

For a two-part adhesive such as those of the invention to be most easily used in commercial and industrial environments, the volume ratio at which the two-parts are combined should be a convenient whole number. This facilitates application of the adhesive with conventional, commercially available dispensers. Such dispensers are shown in U.S. Pat. Nos. 4,538,920 and 5,082,147 (incorporated herein by reference) and are available from Conprotec, Inc. (Salem N.J.) under the trade name MIXPAC. Typically, these dispensers use a pair of tubular receptacles arranged side-by-side with each tube being intended to receive one of the two-parts of the adhesive. Two plungers, one for each tube, are simultaneously advanced (e.g., manually or by a hand-actuated ratcheting mechanism) to evacuate the contents of the tubes into a common, hollow, elongated mixing chamber that may also contain a static mixer to facilitate blending of the two-parts. The blended adhesive is extruded from the mixing chamber onto a substrate. Once the tubes have been emptied, they can be replaced with fresh tubes and the application process continued.

The ratio at which the two-parts of the adhesive are combined is controlled by the diameter of the tubes. (Each plunger is sized to be received within a tube of fixed diameter, and the plungers are advanced into the tubes at the same speed.) A single dispenser is often intended for use with a variety of different two-part adhesives and the plungers are sized to deliver the two-parts of the adhesive at a convenient mix ratio. Some common mix ratios are 1:1, 2:1, 4:1 and 10:1, but preferably less than 10:1.

The part of the adhesive or polymerizable compositions of the invention which contain the amineorganoborane complex preferably displays thermal stability at, or above, room temperature. Thermal stability as used herein means the amine organoborane complex does not disassociate and initiate polymerization of the olefinic unsaturated compounds present in the composition. Thermal stability can be measured by determining the temperature at which the viscosity of the composition begins to increase. Preferably the temperature at which the viscosity of the composition increases is greater than about 40° C., more preferably greater than about 60° C. and most preferably greater than about 80° C. The increase in viscosity indicates that the amine borane complex is disassociating and polymerization has been initiated. In the embodiment wherein the composition is used as an adhesive, the adhesive preferably demonstrates a lap shear strength of about 100 psi. (689 kPa) or greater, more preferably about 250 psi (1724 kPa) or greater and more preferably about 400 psi (2758 kPa) or greater according to the following test procedure.

The adhesive components are mixed and applied to one or both substrates (1 in×4 in×⅛ in (25.4 mm×101.6 mm×3.2 mm) polypropylene coupons). Adhesive bead thickness may be controlled by the addition of a few weight percent of glass beads between 0.005 to 0.030 inches in diameter (0.13 mm to 0.76 mm). The coupons are mated to provide 0.5 inch squared (161 mm$^2$) to 1.0 inch squared (645 mm$^2$) substrate overlap in a lap-shear testing configuration. The samples are held in place with metal binder clips to provide constant force and facilitate the elimination of air bubbles in the adhesive during cure. The bonded samples were usually cured for at least about 24 hours before being mounted in a tensile testing apparatus (Instron) fitted with a sample oven. The samples are evaluated at crosshead speeds of 0.05 (0.13 mm) and 0.5 (12.7 mm) inches per minute for room temperature and 110° C. testing conditions, respectively. Maximum load (pounds) to break are recorded and maximum stress (psi) is calculated by dividing this load by the overlap area (inches squared).

Preferably the mixed 2 part compositions of the invention have a suitable viscosity to allow application without dripping. Preferably, the viscosities of the two individual components should be of the same order of magnitude. Preferably the mixed compositions have the viscosity of about 100 (0.1 Pa.s) centipoise or greater, more preferably about 1,000 (1.0 Pa.s) centipoise or greater and most preferably about 5,000 (5.0 Pa.s) centipoise or greater. Preferably the adhesive compositions have a viscosity of about 150,000 (150 Pa.s) centipoise or less, more preferably about 100,000 (100 Pa.s) centipoise or less and most preferably about 50,000 (50 Pa.s) centipoise or less.

The additive package in a plastic substrate may impact the adhesion of a composition of the invention to such substrate. Certain additives have been found to be incompatible with the active components of the compositions of this invention. One skilled in the art can readily determine those additives which impact the adhesion by performing simple adhesion studies on the substrate. Common additives which negatively impact adhesion are Irganox 1076, inhibitor available from Ciba Specialty Chemical Corporation and potassium iodide. Common additives which do not significantly impact the adhesion include Irgaphos 168 inhibitor, Tinuvin 328 inhibitor, Tinuvin 770 inhibitor, Irganox 1010 inhibitor, available from Ciba Specialty Chemical Corporation, and Calcium stearate.

Specific Embodiments

The following examples are included for illustrative purposes only and are not intended to limit the scope of the claims. Unless otherwise stated all parts and percentages are by weight.

Preparation of Adhesive Compositions

Two component (part) adhesives are produced as described below. One component (hardener) includes the organoborane amine complex mixed with "reactive diluents" or "non-reactive diluents". "Reactive diluent" means a material or compound which is reactive with some component of the resin, either the acrylic (during polymerization), the initiator, or both. Non-reactive diluents are not reactive with the resin components, such as glass spheres or low boiling solvents. Low boiling solvent is defined as one which boils at a temperature below the disassociation temperature of the organoborane amine complex, i.e., the temperature at which the complex decouples. The amount of diluent is established by viscosity control and/or volumetric concerns (to achieve a given volume ratio of hardener component to resin component). The other component (resin) is the acrylic resin with an initiator, for example, acrylic acid or more preferred an isocyanate, such as, isophorone diisocyanate, that decomplexes the organoborane amine complex, by reacting with the amine, when mixed with the hardener. The acrylic resin is a mixture of methylmethacrylate (MMA) and polymethylmethacrylate (PMMA, 350,000 amu mol weight) except as noted hereinafter. The MMA and PMMA are stirred or rotated overnight to mix the PMMA into the MMA. The resin is 80/20 weight percent MMA and PMMA, with an added amount of decomplexing agent (isocyanate), as shown by the percent IPDI (Isophorone diisocyanate, unless otherwise stated) column. The resulting acrylic resin plus initiator preferably has a viscosity of about 1000 to 50,000 centipoise (cP) (1.0 Pa.S to 50 Pa.S). The above procedure provides the preferred mode of formulation, where no polymerizable species is added to the hardener side of the 2 part adhesive. This formulation gives very long shelf life (>5 weeks at 50° C.).

The adhesive may be mixed in the desired ratio in air, in a bag, or through a pressurized gun. The adhesive is applied to test strips 1 inch (25.4 mm) wide with a ½ inch (12.7 mm) overlap and is tested for adhesive strength as described previously. Polypropylene is used for low temperature tests and syndiotactic polystyrene (SPS)/nylon blends or e-coated metal sheets are used for high temperature testing. High temperature testing is performed on an Instron test machine as described above. The test strip is equilibrated to the desired temperature in the Instron tester's oven for at least 5 minutes before the test is started.

Polymerizable compositions of the invention containing amine organoborane complexes were prepared and tested as described herein.

The following abbreviations are used in the Tables.

Am refers generally to amines as specified which are complexed with the borane.

PBMA is polybutylmethacrylate.

H is Hardener.

R is Resin.

MOPA is methoxy propylamine.

MeCl2 is methylene chloride.

Dytek A is 2-methyl-1,5-diaminopentane, sold by Dupont Co.

HMDI is hexamethylene diisocyanate.

TDI is 2,4-toluene diisocyanate.

P-94 is PAPI*-94 polymeric MDI, with 2.4 average equivalents NCO/mol.

P-27 is PAPI*-27 Polymeric MDI, with 2.7 average equivalents NCO/mol.

UnRd is an unreactive diluent.

DMAPA is dimethylaminopropylamine.

TBB is tri-n-butyl borane.

PMMA is polymethyl methacrylate.

IPDA is cis or trans isophorone diamine.

VS5500 refers to a hollow glass sphere product of the 3M Corporation.

Cabosil is a trademark of The Cabot Corporation for colloidal silica particles.

AP Si is aminopropyl silanized silica gel.

N2PPO 300 (or N2-300) is O-(2-aminopropyl-O'-(2-methoxyethyl)polypropylene glycol) (300 Eq. Wt.).

IPDI is isophorone diisocyanate.

Polycap 300 is 300 molecular weight polycaprolactone triol.

N2PPO 115 is 115 amu (atomic mass unit) equivalent weight poly(propylene glycol)bis(2-amino-propyl ether).

N2PPO 450 is 450 amu equivalent weight poly(propylene glycol)bis(2-amino-propyl ether).

N2PPO 1000 is 1000 amu equivalent weight poly (propylene glycol)bis(2-aminopropyl ether).

DEA is diethanol amine.

E400 is an ethylene oxide based diol having a molecular weight of about 400.

T-9 is stannous octanoate tin catalyst for urethane polymerization available from Air Products Corporation.

N2-C9 is diamino nonane.

RD is reactive diluent.

*PAPI is a Trademark of The Dow Chemical Company.

In Examples 1 to 71 the hardener was prepared by mixing the reactive diluent (RD), the amine (Am) plus organoborane (TBB) as the organoborane amine complex and VS5500 glass spheres in the weight ratios as described below, generally a total of 5 grams of these components were used. In Examples 72–91 the hardener was made by mixing the organoborane amine complex, the reactive diluent, unreactive diluent, amine and VS5500 in the weights specified below. In Examples 87 to 91 the hardener was prepared by mixing the VS5500 glass spheres, organoborane (TBB), unreactive diluent (UnRD), reactive diluent (RD) and the amine (Am) in the weights specified below. All of the formulations used in these examples had a 4:1 resin:hardener mix ratio, by volume, except Examples 72 to 86 wherein the hardener to resin mix ratios were as specified in Table 3 and C-2 which was 25:1. The adhesive was applied to polypropylene substrates or e-coated metal, or other high temperature substrate, as described hereinabove. Also tabulated are values for the amount of organoborane in the hardener as a weight percent (% TBB/H), the amine nitrogen atom to boron atom ratio (N/B ratio), the amine nitrogen plus any other active hydrogen equivalents to isocyanate reactive group ratio (N/NCO ratio), the weight percent urea as defined by the weight of all the amine plus isocyanate normalized by the total weight of the adhesive. Lap shears were determined on a tensile testing apparatus as described above. In the tables referring to lap shear results>means substrate failure occurs prior to adhesive failure.

EXAMPLES 1 TO 53

In Examples 1 to 53 all hardeners were formulated to make 5.0 grams. In Examples 1 to 4, 20 percent by weight of a polymer diluent of a polymethylmethacrylate polybutylmethacrylate copolymer having a 75,000 amu molecular weight was blended into the reactive diluent. In all of Examples 1 to 19 and 22–53, the TBB/H percent ratio was 10 (10 percent of the hardener by weight is TBB). In Examples 20 and 21 the organoborane used was triethylborane. The amount of triethylborane present was 0.27 g and the TEB/H percent ratio was 5.4. In Examples 37 and 41 the isocyanate was HMDI. In Example 38 the isocyanate was toluene diisocyanate. In Examples 39 and 42 the isocyanate was a polymeric MDI available from The Dow Chemical Company under the trademark and designation PAPI 94. In Examples 40 and 43 the isocyanate used was a polymeric MDI available from The Dow Chemical Company under the trademark and designation PAPI 27. In Examples 44–47 the reactive diluent is given as a weight ratio of the components listed by the values in the parentheses. In Examples 48, 49, and 51 the amine used as a reactive diluent is a solid, amine capped polypropylene oxide (1000 mw) dissolved in a liquid amine at a 1:1 weight ratio. In Example 50 the volume amounts of solid N2-PPO to liquid Dytek A in the reactive diluent was 75 percent to 25 percent, respectively. In Examples 52 and 53 the reactive diluents are a mixture of the listed amine and diamino nonane at a 1:1 weight ratio. In the examples where the amount of VS5500 in the reactive diluent is not specifically given as a ratio (Examples 25, 29, 49, and 51), the amount of glass is 40% by weight of the total weight of the hardener. The density of the resin in Table 1 is 1.

Table 1 illustrates the effectiveness of different classes of amines and amine blends with alcohols and nonreactive diluents. Also shown in Table 1 are examples using various isocyanates as the decomplexing agent. The general classes shown here are: polymer thickened amines, higher functional amines and aminols, oligomeric diamines, blends of solid and liquid amines, and blends of amines and alcohols and diols. Among the amines are structural variants including mono-amines, diamines, branched diamines, aliphatic cyclic amines, alkanolamines, diamines with primary and higher order amines, and polyether amines. The results in Table 1 demonstrate that excellent adhesion to plastic substrates is achieved by the compositions described.

TABLE 1

| Example | Reactive Diluent (RD) | RD Wt. | Am | Am Wt. | N/B | % IPDI | Density H | N/NCO | % Urea | RT Lap (psi) | Rt Lap (kPa) | 125 C (e-coat) | 125 C Lap (kPa) |
|---|---|---|---|---|---|---|---|---|---|---|---|---|---|
| 1 | DMAPA | 3.85 | IPDA | 0.65 | 13.8 | 25 | 0.9 | 0.76 | 34.1 | 168 | (1158) | | |
| 2 | MOPA | 3.85 | IPDA | 0.65 | 15.4 | 25 | 0.92 | 0.86 | 34.3 | 226 | (1558) | | |
| 3 | IPDA | 3.85 | IPDA | 0.65 | 16.0 | 25 | 0.98 | 0.95 | 34.8 | >390 | (>2689) | | |
| 4 | Hexylamine | 3.85 | IPDA | 0.65 | 13.9 | 25 | 0.85 | 0.72 | 33.7 | 224 | (1544) | | |
| 5 | IPDA | 3.85 | IPDA | 0.65 | 19.2 | 30 | 0.92 | 0.90 | 41.2 | 333 | (2296) | | |
| 6 | 75/25 IPDA/VS5500 | 3.85 | IPDA | 0.65 | 15.1 | 25 | 0.74 | 0.68 | 32.1 | >581 | (>4005) | | |
| 7 | 75/25 IPDA/VS5500 | 3.85 | IPDA | 0.65 | 15.1 | 20 | 0.74 | 0.85 | 27.9 | 249 | (1717) | | |
| 8 | 75/25 IPDA/VS5500 + Cabosil (.17 g) | 3.85 | IPDA | 0.65 | 15.1 | 25 | 0.74 | 0.68 | 32.1 | 276 | (1902) | | |
| 9 | IPDA/AP Si (6.7/33) | 3.85 | IPDA | 0.65 | 13.8 | 25 | 1.12 | 0.94 | 33.5 | 127 | (876) | | |
| 10 | MOPA/MeCl2 50/50 | 3.85 | IPDA | 0.65 | 10.7 | 20 | 0.98 | 0.80 | 33.8 | >488 | (>3364) | | |
| 11 | 75/25 MOPA/VSS500 | 3.85 | IPDA | 0.65 | 14.6 | 25 | 0.71 | 0.63 | 31.9 | 322 | (2220) | | |
| 12 | MOPA/Cabosil (0.75 g) | 4.16 | MOPA | 0.34 | 15.1 | 25 | 0.95 | 0.87 | 34.6 | 122 | (841) | | |
| 13 | 75/25 MOPA/AP Si-VS5500 | 3.85 | IPDA | 0.65 | 14.6 | 25 | 0.71 | 0.63 | 31.9 | 338 | (2330) | | |
| 14 | Morpholine/AP Si (67/33) | 3.85 | IPDA | 0.65 | 13.5 | 25 | 1.04 | 0.86 | 33.0 | 248 | (1710) | | |
| 15 | DMAPA | 3.85 | IPDA | 0.65 | 16.5 | 30 | 0.84 | 0.70 | 40.4 | 156 | (1076) | | |
| 16 | Hexylamine | 3.85 | IPDA | 0.65 | 16.6 | 30 | 0.8 | 0.68 | 40.0 | 164 | (1131) | | |
| 17 | Dytek A/MeCl2 (51:50) | 3.85 | IPDA | 0.65 | 14.9 | 25 | 0.96 | 0.87 | 37.6 | >622 | (>4289) | | |
| 18 | Dytek A/MeCl2/VS5500 (25/25/50) | 4.05 | Dytek A | 0.45 | 9.2 | 15 | 0.53 | 0.49 | 23.8 | 220 | (1517) | | |
| 19 | (50/50) Dytek A/VS 5500 | 4.16 | MOPA | 0.34 | 14.4 | 25 | 0.58 | 0.51 | 28.0 | 250 | (1724) | | |
| 20 | (55/45) Dytek A/VS 5500 | 4.41 | Dytek A | 0.32 | 31.9 | 25 | 0.58 | 0.61 | 28.2 | >302 | (>2082) | | |
| 21 | (55/45) Dytek A/VS 5500 | 4.41 | Dytek A | 0.32 | 31.9 | 15 | 0.58 | 1.02 | 19.5 | >637 | (>4392) | | |
| 22 | N2PPO 300 | 3.85 | IPDA | 0.65 | 7.5 | 15 | 1.02 | 0.77 | 30.2 | 293 | (2020) | | |
| 23 | N2PPO 300 | 2.19 | N2-300 | 2.31 | 5.5 | 10 | 1 | 0.83 | 26.0 | >473 | (>3261) | >665 | (>4585) |
| 24 | N2PPO 300/VS5500 (50/50) | 2.19 | N2-300 | 2.31 | 4.1 | 5 | 0.75 | 0.95 | 18.4 | >595 | (>4102) | >223 | (>1538) |
| 25 | IPDA/MOPA (50/50)/S5500 | 3.85 | IPDA | 0.65 | 10.8 | 15 | 0.6 | 0.66 | 24.8 | >428 | (>2951) | | |
| 26 | N2PPO 300/MOPA (50/50) | 3.85 | IPDA | 0.65 | 13.0 | 20 | 0.95 | 0.94 | 33.4 | 418 | (2882) | | |
| 27 | Polycap 300/MOPA (50/50) | 4.16 | MOPA | 0.34 | 17.5 | 30 | 0.95 | 0.84 | 41.5 | 170 | (1172) | | |
| 28 | Polycap 300/IPDA (75/25) | 3.85 | IPDA | 0.65 | 17.4 | 30 | 1 | 1.03 | 42.0 | 166 | (1145) | | |
| 29 | N2PPO 300/IPDA (50/50)/VS5500 | 3.85 | IPDA | 0.65 | 8.1 | 10 | 0.6 | 0.74 | 20.4 | >617 | (>4254) | | |
| 30 | N2-Menthane | 3.85 | IPDA | 0.65 | 19.3 | 30 | 0.92 | 0.90 | 41.2 | 318 | (2193) | | |
| 31 | N2PPO 115 | 3.85 | IPDA | 0.65 | 15.0 | 25 | 0.95 | 0.87 | 37.5 | 295 | (2034) | | |
| 32 | N2PPO 450 | 3.85 | IPDA | 0.65 | 5.9 | 10 | 1.04 | 0.94 | 26.5 | 190 | (1310) | | |
| 33 | Diethanol amine (DEA) | 3.85 | IPDA | 0.65 | 16.1 | 50 | 1.06 | 1.38 | 58.4 | 255 | (1758) | | |
| 34 | 75/25 DEA/VS5500 | 3.85 | IPDA | 0.65 | 32.8 | 40 | 0.8 | 1.00 | 45.1 | 240 | (1655) | | |
| 35 | Methyl benzyl amine (MBA) | 3.85 | IPDA | 0.65 | 14.4 | 25 | 0.95 | 0.83 | 37.5 | 164 | (1131) | | |
| 36 | Ethanolamine/VS5500 50/50 | 3.85 | IPDA | 0.65 | 14.3 | 25 | 0.6 | 0.94 | 33.5 | >603 | (>4158) | | |
| 37 | 60/40 IPDA/75K PMMA | 3.85 | IPDA | 0.65 | 12.7 | HMDI, 15 | 1.05 | 1.03 | 24.2 | 240 | (1655) | | |
| 38 | 60/40 IPDA/75K PMMA | 3.85 | IPDA | 0.65 | 12.7 | TDI, 20 | 1.05 | 0.80 | 28.2 | 304 | (2096) | | |
| 39 | 50/50 IPDA/VS5500 | 3.85 | IPDA | 0.65 | 11.0 | P-94, 15 | 0.6 | 0.84 | 29.5 | >416 | (>2868) | | |
| 40 | 60/40 IPDA/75K PMMA | 3.85 | IPDA | 0.65 | 12.7 | P27, 25 | 1.07 | 0.87 | 32.2 | 163 | (1124) | | |
| 41 | 80/20 IPDA/75K PMMA | 3.85 | IPDA | 0.65 | 16.0 | HMDI, 20 | 0.98 | 0.91 | 30.7 | 321 | (2213) | | |
| 42 | 80/20 MOPA/75K PMMA | 4.16 | MOPA | 0.34 | 15.0 | P-94, 30 | 0.89 | 0.85 | 37.9 | 190 | (1310) | | |
| 43 | 80/20 MOPA/75K PMMA | 4.16 | MOPA | 0.34 | 15.0 | P27, 25 | 0.89 | 0.85 | 33.8 | 169 | (1165) | | |
| 44 | Gly/IPDA/PMMA (1/4.2/25) | 3.85 | IPDA | 0.65 | 17.2 | 11.6 | 1.05 | 0.7 | 38 | 102 | (703) | | |
| 45 | DEA/IPDA/VS550 (1/1/2) | 3.85 | IPDA | 0.65 | 14.5 | 10.2 | 0.6 | 1.04 | 30 | >668 | (>4606) | | |
| 46 | Gly/MOPA/PMMA (1/4.2/2.8) | 4.16 | MOPA | 0.34 | 16.5 | 12.7 | 1.05 | 0.65 | 38 | 169 | (1165) | | |
| 47 | DEA/MOPA/PMMA (1/38/2.5) | 4.16 | MOPA | 0.34 | 16.1 | 12.6 | 1.05 | 0.77 | 38 | 171 | (1179) | | |
| 48 | N2-PPO (1000)/DMAPA | 3.85 | IPDA | 0.65 | 10.4 | 15 | 0.94 | 0.94 | 29.3 | 94 | (648) | | |
| 49 | N2-PPO/DMAPA/VS5500 | 3.85 | IPDA | 0.65 | 6.6 | 10 | 0.6 | 0.60 | 20.4 | >584 | (>4027) | | |
| 50 | N2-PPO 1000/Dytek A | 3.85 | IPDA | 0.65 | 9.9 | 15 | 1.01 | 1.01 | 30.1 | 211 | (1455) | | |
| 51 | N2-PPO (1000)/Dytek A/VS5500 | 3.85 | IPDA | 0.65 | 9.2 | 10 | 0.6 | 0.84 | 20.4 | >478 | (>3296) | | |
| 52 | N2-C9/DMAPA | 3.85 | IPDA | 0.65 | 18.5 | 30 | 0.87 | 0.82 | 40.7 | 221 | (1524) | | |
| 53 | N2-C9/IPDA | 3.85 | IPDA | 0.65 | 19.9 | 30 | 0.91 | 0.92 | 41.1 | 248 | (1710) | | |

EXAMPLES 54 TO 71

Examples 54 to 73 were performed with varying amounts of organoborane TBB (tributyl borane) catalyst in the formulation of the hardener, and varying N/B ratios. In these Examples the organoborane amine molar ratio is 1:0.5 molar for the triethylborane Dytek A amine complex and 1:1.4 for the other complexes. In all of Examples 54 to 77 and C1, the reactive diluent included 40 percent by weight of VS5500. The organoborane used in Examples 57, 62 and 68–71 was triethylborane (TEB).

TABLE 2

| Example | TBB wt | Reactive Diluent (RD) | RD wt. | Amine (Am) | Am wt | % TBB/H | N/B | % IPDI | N/NCO | % Urea | RT Lap (psi) | RT Lap (kPa) | 125 C (psi), e-coat | 125 C Lap (kPa) |
|---|---|---|---|---|---|---|---|---|---|---|---|---|---|---|
| 54 | 0.26 | IPDA | 4.40 | IPDA | 0.34 | 1.0 | 22.5 | 14 | 0.77 | 22.2 | 209 | (1441) | 800 | (5516) |
| 55 | 0.52 | IPDA | 3.80 | IPDA | 0.68 | 2.1 | 10.2 | 12.5 | 0.78 | 20.6 | 39 | (269) | 650 | (4482) |
| 56 | 0.778 | IPDA | 3.20 | IPDA | 1.02 | 3.1 | 6.1 | 11 | 0.79 | 18.9 | >613 | (>4226) | 1900 | (13100) |
| 57 | 0.42 | IPDA | 3.56 | IPDA | 1.02 | 1.7 | 13.1 | 13 | 0.78 | 21.4 | >654 | (>4509) | 1350 | (9308) |
| 58 | 1.035 | IPDA | 2.61 | IPDA | 1.36 | 4.1 | 4.1 | 10 | 0.77 | 17.7 | 388 | (2675) | 1400 | (9653) |
| 59 | 0.26 | MOPA | 4.56 | MOPA | 0.18 | 1.0 | 21.5 | 13 | 0.79 | 21.3 | 284 | (1958) | 400 | (2758) |
| 60 | 0.52 | MOPA | 4.12 | MOPA | 0.36 | 2.1 | 9.7 | 11.5 | 0.81 | 19.5 | >488 | (>3664) | 350 | (2413) |
| 61 | 0.778 | MOPA | 3.69 | MOPA | 0.53 | 3.1 | 5.8 | 10.5 | 0.79 | 18.2 | >810 | (>5584) | 1000 | (6894) |
| 62 | 0.42 | MOPA | 4.05 | MOPA | 0.53 | 1.7 | 12.6 | 12 | 0.80 | 20.3 | >886 | (>6108) | 630 | (4344) |
| 63 | 1.035 | MOPA | 3.26 | MOPA | 0.71 | 4.1 | 3.9 | 9 | 0.82 | 16.5 | >531 | (>3661) | 250 | (3103) |
| 64 | 0.26 | Dytek A | 4.51 | Dytek A | 0.23 | 1.0 | 33.0 | 20 | 0.79 | 27.4 | 202 | (1393) | 450 | (3103) |
| 65 | 0.52 | Dytek A | 4.02 | Dytek A | 0.46 | 2.1 | 15.0 | 17.5 | 0.81 | 24.8 | 234 | (1613) | 600 | (4136) |
| 66 | 0.778 | Dytek A | 3.53 | Dytek A | 0.69 | 3.1 | 9.0 | 16 | 0.80 | 23.1 | 391 | (2696) | 600 | (4137) |
| 67 | 1.035 | Dytek A | 3.04 | Dytek A | 0.92 | 4.1 | 6.0 | 14 | 0.81 | 20.9 | 350 | (2413) | 440 | (3034) |
| 68 | 0.14 | Dytek A | 4.78 | Dytek A | 0.08 | 0.6 | 34.5 | 20 | 0.82 | 27.6 | 31 | (214) | 550 | (3792) |
| 69 | 0.28 | Dytek A | 4.55 | Dytek A | 0.17 | 1.1 | 30.5 | 19.5 | 0.80 | 26.9 | 303 | (2089) | 400 | (2758) |
| 70 | 0.418 | Dytek A | 4.33 | Dytek A | 0.25 | 1.7 | 19.4 | 18.5 | 0.80 | 25.8 | >551 | (>3799) | 575 | (>3964) |
| 71 | 0.558 | Dytek A | 4.11 | Dytek A | 0.33 | 2.2 | 13.7 | 17.5 | 0.80 | 24.7 | >543 | (>3744) | 650 | (4482) |
| C-1[1] | 0.778 | IPDA | 3.20 | IPDA | 1.02 | 4.69 | 6.1 | 7[2] | .80 | 0 | Soft | — | 30 | (207) |
| C-2[2] | 0.88 | 0 | 0 | MOPA | 0.59 | 3.85 | 1.36 | 4[2] | — | 0 | >578 | (>3985) | 280 | (1930 |

Examples
[1]Comparative Example
[2]Acrylic Acid Decomplexing Agent.

All adhesives of the invention gave good strength at room and high temperature. A comparative example (C-1) with the high N/B ratio of the present invention but using AA (acrylic acid) instead of isocyanate as the initiator produced a poor adhesive at all temperatures. A second comparative example (C-2), using a low N/B ratio, a 25:1 mix ratio, and acrylic acid initiation, produced a good room temperature adhesive, but a poor adhesive at elevated temperature compared to the subject of the present invention. In the second comparative example the complex was made by adding 1.36 moles of MOPA to 1 mole of TBB. 4 weight percent of that complex was added to a resin consisting of 80 parts MMA and 20 parts PMMA (350 k Mw) with 4 weight percent acrylic acid added. The mixture was applied to polypropylene or e-coated metal substrates for testing at RT or 125° C., respectively. The adhesive was allowed to cure over 3 days before testing.

EXAMPLES 72–86

Several adhesive formulations were prepared as described above. In Examples 72 to 77 the reactive diluent and amine were both isophorone diamine. In Examples 78 to 82 the reactive diluent and amine were both MOPA and the unreactive diluent was methylene chloride. In Examples 83 to 86 the amine and reactive diluent were Dytek A. Lap shear testing was performed on plaques made of a blend of nylon-6 and syndiotactic polystyrene (SPS) at 125 and 150° C. For the lap shear tests in Examples 72 to 77 at 150° C., and 78 to 82 at 125° C., the plaques contained 30 percent SPS in nylon 6. Examples 72 to 77 and 83–86 tested at 125° C. used plaques containing 15 percent of SPS in nylon 6.

Examples 72 to 86 illustrate for different amine based hardeners, and the effect of a changing N/B ratio on high temperature lap shears. Constant in the each set of series is the amount of organoborane in the adhesive (not constant in the hardener), amount of filler (VS5500)/g liquid in the hardener, and the N/NCO ratio. Unique in these examples are the mix ratio (R/H, Resin/Hardener), which varied in 2 of the series. The resin was as described previously. FIG. 1 shows the increasing lap shear strength as a function of increasing the N/B ratio. Low N/B ratio adhesives also have good strength due to the use of solvent and/or VS5500 glass spheres as heat management aids.

TABLE 3

| Example | TBB wt | VS5500 Wt. | UnRD wt % | RD wt. | Am wt. | % TBB in H | R/H[3] | N/B | % IPDI | N/NCO | % Urea | 125 C Lap Psi (kPa) | 150 C Lap Psi (kPa) |
|---|---|---|---|---|---|---|---|---|---|---|---|---|---|
| 72 | 1.08 | 7.41 | | 9.48 | 0.55 | 5.82 | 5.40 | 19.89 | 15.00 | 0.87 | 21.12 | | 546 (3765) |
| 73 | 1.04 | 5.56 | | 6.76 | 0.53 | 7.46 | 7.20 | 15.06 | 11.00 | 0.87 | 16.07 | 1190 (8204) | |
| 74 | 1.00 | 3.77 | | 4.15 | 0.51 | 10.56 | 10.60 | 10.02 | 7.00 | 0.87 | 10.66 | 1084 (7474) | 483 (3330) |
| 75 | 0.96 | 2.13 | | 1.74 | 0.49 | 18.02 | 18.80 | 4.98 | 3.30 | 0.88 | 5.25 | 966 (6660) | |
| 76 | 0.94 | 1.36 | | 0.61 | 0.48 | 27.76 | 29.50 | 2.48 | 1.60 | 0.89 | 2.60 | 350 (2413) | |
| 77 | 0.93 | 0.93 | | 0.00 | 0.48 | 40.04 | 43.00 | 1.07 | 0.70 | 0.86 | 1.14 | 817 (5633) | 381 (2627) |
| 78 | 1.14 | 10.00 | 2.00 | 11.25 | 0.61 | 4.55 | 4.00 | 21.33 | 17.50 | 0.85 | 23.49 | 338 (2330) | |
| 79 | 1.14 | 10.00 | 5.00 | 8.25 | 0.61 | 4.55 | 4.00 | 15.93 | 13.00 | 0.85 | 17.49 | 267 (1841) | |
| 80 | 1.14 | 10.00 | 8.00 | 5.25 | 0.61 | 4.55 | 4.00 | 10.54 | 8.60 | 0.85 | 11.57 | 248 (1710) | |
| 81 | 1.14 | 10.00 | 11.00 | 2.25 | 0.61 | 4.55 | 4.00 | 5.15 | 4.20 | 0.85 | 5.65 | 233 (1606) | |
| 82 | 1.14 | 10.00 | 13.25 | 0.00 | 0.61 | 4.55 | 4.00 | 1.10 | 0.90 | 0.85 | 1.21 | 172 (1186) | |
| 83 | 2.06 | 5.71 | | 5.79 | 0.72 | 14.40 | 7.00 | 9.93 | 14.50 | 0.86 | 18.39 | 882 (6081) | |
| 84 | 1.95 | 3.39 | | 2.45 | 0.68 | 23.04 | 11.80 | 5.03 | 7.00 | 0.86 | 9.34 | 843 (5812) | |
| 85 | 1.90 | 2.29 | | 0.86 | 0.67 | 33.30 | 17.50 | 2.51 | 3.40 | 0.86 | 4.66 | 745 (5137) | |
| 86 | 1.88 | 1.70 | | 0.00 | 0.66 | 44.10 | 23.50 | 1.13 | 1.50 | 0.86 | 2.09 | 712 (4909) | |

[3]Volume ratio.

EXAMPLES 87–91

Figure 2:
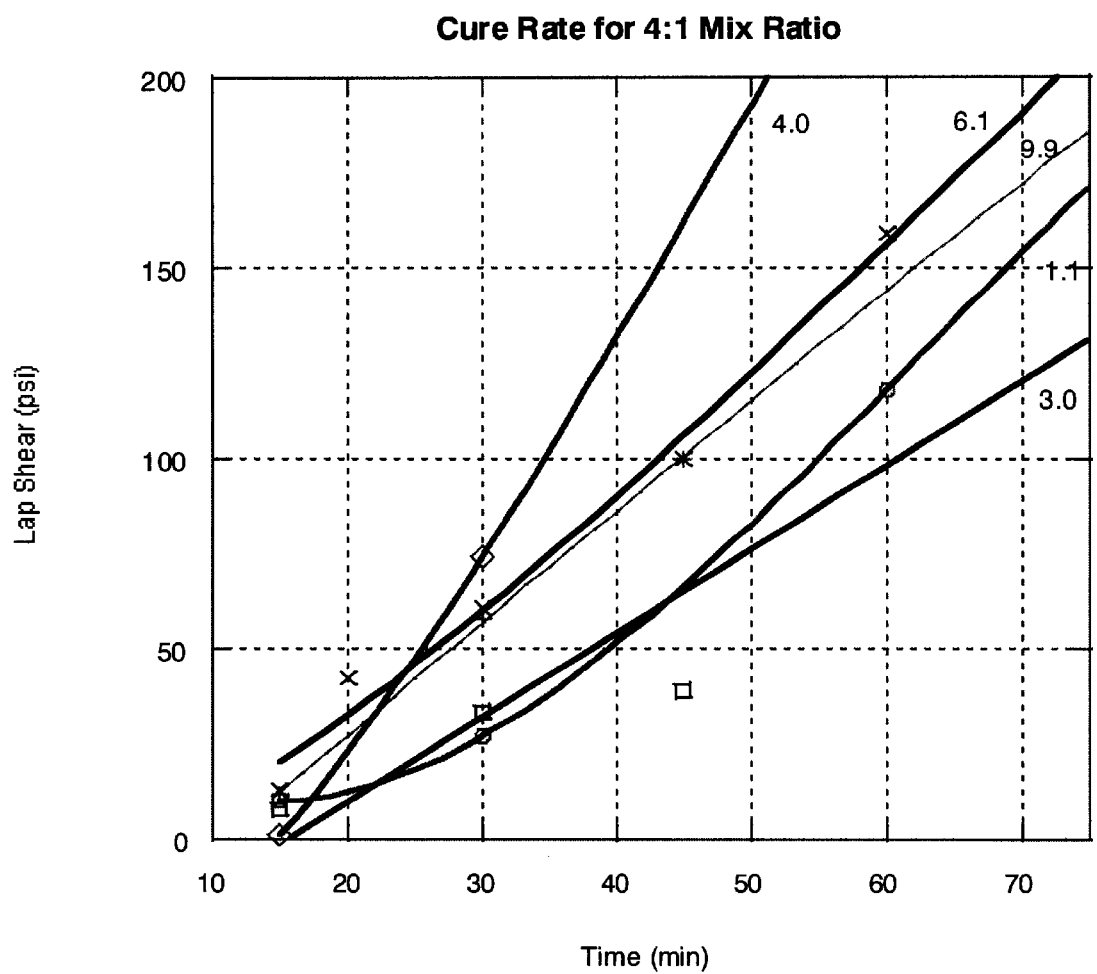
FIG. 2 illustrates the cure rate of adhesives at various amine nitrogen to boron atomic ratios.

Adhesive formulations were prepared using the MMA-PMMA resin side as described before and a hardener side as described in Table 4, wherein the unreactive diluent is methyl methacrylate, the reactive diluent is isophorone diamine, the hardener side contains 6.0 grams of a VS5500 glass bead formulation (Example 91 uses 4.5 grams in the hardener and 1.5 grams in resin of VS5500), the amine weight is 1.2 g, the resin to hardener volume ratio is 4.0:1.0 and the amine equivalent to isocyanate equivalent ratio is 0.8. FIG. 2 shows the cure rate of the series of adhesives at varied N/B ratios. The lines are cubic fits to the time data so as to observe graphically the time at which the adhesives cure to a given strength, 50 psi (Green Time). For these adhesives the Green times are 39, 38, 25.6, 26.3, 27.7 minutes for N/B ratios of 1.1, 3, 4, 6.1, 9.9, respectively. The Green time for even low N/B ratios is good due to the selection of decomplexer, acrylic resin components, and heat management components.

TABLE 4

| Example | TBB wt. | UnRD wt. | RD wt. | % TBB in H | N/B | % IPDI | % Urea | Green Time (min) |
|---|---|---|---|---|---|---|---|---|
| 87 | 2.3 | 5.5 | 0.0 | 15.6 | 1.1 | 2.0 | 2.8 | 39 |
| 88 | 2.3 | 3.4 | 2.1 | 15.6 | 3.0 | 5.4 | 7.6 | 38 |
| 89 | 2.3 | 2.3 | 3.2 | 15.6 | 4.0 | 7.3 | 10.2 | 25.6 |
| 90 | 2.3 | 0.0 | 5.5 | 15.6 | 6.1 | 11.0 | 15.4 | 26.3 |
| 91 | 2.4 | 0.0 | 9.9 | 13.3 | 9.9 | 18.0 | 24.7 | 27.7 |

What is claimed is:

1. A two part composition useful for initiating cure of one or more polymerizable monomers which cure when exposed to free radicals, the composition comprising in one part an organoboraneamine complex and in a second part an isocyanate which is capable of decomplexing the organoborane complex wherein the equivalent ratio of amine nitrogen atoms to boron atoms is greater than 4.0:1 wherein the equivalents ratio of isocyanate to amine is greater than 1:0:1.0.

2. The two part composition according to claim 1 wherein the equivalent ratio of amine to isocyanate is 1.25:1.0 or less.

3. The two part composition according to claim 2 wherein the amine to isocyanate equivalent ratio is less than 1.0:1.0.

4. The two part composition according to claim 3 wherein the organoborane comprises a trialkyl borane or an alkyl cycloalkyl borane and the amine comprises a primary amine; a secondary amine; a polyamine having primary or secondary amines or both; ammonia; polyoxyalkylene amines; the reaction product of a diamine and a difunctional compound having moieties which react with an amine, wherein the reaction product has terminal amine groups; aryl amities; heterocyclic amines; a compound having an amidine structural component; aliphatic heterocycles having at least one secondary nitrogen in the heterocyclic ring wherein the heterocyclic compound may also contain one or more additional secondary or tertiary nitrogen atoms, oxygen atoms, sulfur atoms, or double bonds in the heterocycle; alicyclic compounds having bound to the alicyclic ring one or more substituents containing an amine moiety; conjugated imines or a mixture thereof.

5. A composition according to claim 4 wherein the complex of the organoborane and the amine corresponds to the formula

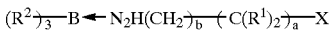

the organoborane heterocyclic amine complex corresponds to the formula;

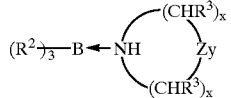

the organoborane amidine complex corresponds to the formula

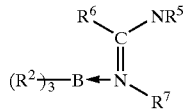

the organoborane conjugated imine complex corresponds to the formula

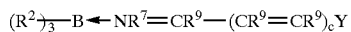

the organoborane alicyclic compound with an amine containing substituent

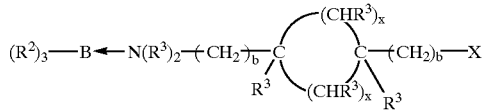

corresponds to the formula
wherein B is boron;
$R^1$ is separately in each occurrence hydrogen, a $C_{1-10}$ alkyl or $C_{3-10}$ cycloalkyl;
$R^2$ Is separately in each occurrence a $C_{1-10}$ alkyl, $C_{3-10}$ cycloalkyl or two or more of $R^2$ may combine to form a cycloaliphatic ring structure;
$R^3$ is separately in each occurrence hydrogen, a $C_{1-10}$ alkyl or $C_{3-10}$ cycloalkyl; $R^4$ is separately in each occurrence hydrogen, $C_{1-10}$ alkyl, $C_{3-10}$ cycloalkyl, $C_{6-10}$ aryl or $C_{6-10}$ alkaryl;
$R^5$ is separately in each occurrence hydrogen, $C_{1-10}$ alkyl, or $C_{3-10}$ cycloalkyl;
$R^6$ is separately in each occurrence hydrogen, a $C_{1-10}$ alkyl, $C_{3-10}$ cycloalkyl or $-N(R^5)_2$;
$R^7$ is separately in each occurrence hydrogen, $C_{1-10}$ alkyl or $C_{3-10}$ cycloalkyl;
two or more of $R^5$, $R^6$ and $R^7$, in any combination, can combine to form a ring structure which can be a single ring or a multiple ring structure and the ring structure can Include one or more of nitrogen, oxygen or unsaturation in the ring structure;
$R^9$ is independently in each occurrence hydrogen, $C_{1-10}$ alkyl or $C_{3-10}$ cycloalkyl, Y, $-(C(R^9)_2-(CR^9=CR^9)_c-Y$ or two or more of $R^9$ can combine to form a ring structure, or one or more of $R^9$ can form a ring structure with Y provided the electron rich group in Y is conjugated with respect to the double bond of the imine nitrogen;

X is a hydrogen-bond accepting group,;

Y is independently in each occurrence hydrogen, $-N(R^4)_2$, $-OR^4$, $-C(O)OR^4$, a halogen or an alkylene group which forms a cyclic ring with it $R^9$;

Z is separately in each occurrence oxygen or $-NR^4$;

a is separately in each occurrence an integer of from about 1 to about 10;

b is separately in each occurrence 0 or 1, with the proviso that the sum of a and b should be from about 2 to about 10;

c is separately in each occurrence an integer of from about 1 to about 10;

x is separately in each occurrence an integer of about 1 to about 10, with the proviso that the total of all occurrence of x is from about 2 to about 10; and y is separately in each occurrence about 0 or 1.

6. A two part polymerizable composition comprising part 1, a) an organoboraneamine complex wherein the ratio of amine nitrogen atoms to boron atoms is greater than 0:1; and part 2, b) one or more of monomers, oligomers or polymers having olefinic unsaturation which is capable of polymerization by free radical polymerization, and c) an effective amount of an isocyanate which causes the complex to disassociate, treeing the borane to initiate polymerization of the one or more monomers, oligomers or polymers having olefinic unsaturation;

wherein the compound which causes disassociation of the complex is kept separate from the complex until initiation of polymerization is desired.

7. A two part polymerizable composition according to claim 6 wherein the ratio of amine to boron atoms is about 5.0:1 or greater.

8. A two part polymerizable composition according to claim 7 wherein the equivalent ratio of amine to isocyanate is 1.25:1.0 or less.

9. A two part polymerizable composition according to claim 8 wherein the amine to isocyanate equivalent ratio is less than about 1.0:1.0.

10. A two part polymerizable composition according to claim 9 wherein the organoborane comprises a trialkyl borane or an alkyl cycloalkyl borane and the amine comprises a primary amine; a secondary amine; a polyamine having primary and/or secondary amines; ammonia; polyoxyalkylene amines; the reaction product of a diamine and a difunctional compound having moieties which react with an amine wherein the reaction product has terminal amine groups; aryl amines; heterocyclic amines; a compound with an amidine structural component; aliphatic heterocycles having at least one secondary nitrogen in the heterocyclic ring wherein the heterocyclic compound may also contain one or more additional secondary or tertiary nitrogen atoms, oxygen atoms, sulfur atoms, or double bonds in the heterocycle; alicyclic compounds having bound to the alicyclic ring one or more substituents containing an amine moiety; conjugated imines and mixtures thereof.

11. A two-part composition according to claim 6 wherein the equivalents ratio of isocyanate to amine is greater than 1.0:1.0.

12. A method of polymerization comprising contacting the components of the polymerizable composition of claim 11 under conditions such that the one or more monomers, oligomers, or polymers undergo polymerization.

13. The method of claim 12 wherein the contacting occurs at, or near, ambient temperature.

14. The method claim 13 which further comprises the step of heating the composition to an elevated temperature under conditions such that the amine and isocyanate may react further.

15. A method of bonding two or more substrates together which comprises a. contacting the components of the composition of claim 11 together under conditions such that polymerization is initiated;

b. contacting the adhesive composition with the two or more substrates;

c. positioning the two or more substrates such that the adhesive composition is located between the two or more substrates wherein they are in contact with one another; and c. allowing the adhesive to cure so as to bind the two or more substrates together.

16. A method of bonding two or more substrates according to claim 15 which further comprises heating the adhesive composition to a temperature such that the amine and isocyanate react further.

17. The method of claim 16 wherein the adhesive composition is heated to a temperature at or above the expected maximum use temperature of the adhesive.

18. A method of modifying the surface of a low surface energy polymer by contacting a composition according to claim 11 with at least a portion of the surface of the low surface energy polymer and causing the complex to disassociate thereby initiating polymerization of the monomer, oligomers, polymers or mixture thereof such that the polymer formed is on the surface of the low surface energy polymer.

19. A method at coating a substrate which comprises contacting the components of the composition of claim 11; contacting the contacted composition with one or more surfaces of a substrate; and allowing the coating Composition to cure.

20. A coating composition which comprises the composition of claim 11.

21. A laminate comprising at least two substrates having disposed between the substrates and bound to each substrate a composition according to claim 11.

* * * * *